US010200661B2

(12) United States Patent
Yata et al.

(10) Patent No.: US 10,200,661 B2
(45) Date of Patent: Feb. 5, 2019

(54) DISPLAY DEVICE WITH A POLARIZATION CONTROL ELEMENT AND A POLARIZATION SEPARATION ELEMENT

(71) Applicant: Japan Display Inc., Tokyo (JP)

(72) Inventors: Tatsuya Yata, Tokyo (JP); Naoyuki Takasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/797,880

(22) Filed: Oct. 30, 2017

(65) Prior Publication Data

US 2018/0124364 A1 May 3, 2018

(30) Foreign Application Priority Data

Oct. 31, 2016 (JP) .................................. 2016-213047

(51) Int. Cl.
*H04N 9/31* (2006.01)
*G03B 21/20* (2006.01)
*G02B 27/01* (2006.01)
*G02B 27/28* (2006.01)

(52) U.S. Cl.
CPC ....... *H04N 9/3144* (2013.01); *G02B 27/0101* (2013.01); *G02B 27/283* (2013.01); *G03B 21/2073* (2013.01); *H04N 9/312* (2013.01); *H04N 9/3155* (2013.01); *H04N 9/3167* (2013.01); *H04N 9/3179* (2013.01);
(Continued)

(58) Field of Classification Search
CPC .............. G03B 21/005; G03B 21/0056; G03B 21/2013; G03B 21/2033; G03B 21/2066; G03B 21/2073; H04N 9/315; H04N 9/317; H04N 9/3111; H04N 9/3167; H04N 9/3197
See application file for complete search history.

(56) References Cited

U.S. PATENT DOCUMENTS 7,656,585 B1 * 2/2010 Powell ................. G02B 5/09
349/11
7,878,656 B2 * 2/2011 Hsu ................. G02B 27/2264
353/20
(Continued)

FOREIGN PATENT DOCUMENTS

JP 11-14394 A 1/1999
JP 11-14398 A 1/1999
(Continued)

*Primary Examiner* — Sultan Chowdhury
(74) *Attorney, Agent, or Firm* — Michael Best & Friedrich LLP

(57) ABSTRACT

According to one embodiment, a display device includes an optical modulation element configured to emit image light corresponding to an image by using illumination light from an illumination device, a polarization control element configured to emit first polarized light, and second polarized light on the basis of the image light receiving from the optical modulation element, a polarization separation element configured to transmit the first polarized light as transmitted light and reflect the second polarized light as reflected light, and a projector configured to project the transmitted light onto a first projection area of a projection plane, and projects reflected light onto a second projection area of the projection plane.

19 Claims, 22 Drawing Sheets

(52) U.S. Cl.
CPC .................. *G02B 2027/014* (2013.01); *G02B 2027/0118* (2013.01); *G02B 2027/0159* (2013.01)

(56) References Cited

U.S. PATENT DOCUMENTS

| | | | |
|---|---|---|---|
| 2005/0185139 A1* | 8/2005 | Yamanaka | G02B 27/283 |
| | | | 353/20 |
| 2006/0028620 A1* | 2/2006 | Conner | G02B 5/04 |
| | | | 353/20 |
| 2009/0009594 A1 | 1/2009 | Kawai | |
| 2009/0262066 A1 | 10/2009 | Oke et al. | |
| 2011/0164221 A1* | 7/2011 | Tilleman | G02B 27/283 |
| | | | 353/20 |
| 2011/0292346 A1* | 12/2011 | Fok | G02B 27/0101 |
| | | | 353/13 |
| 2012/0057084 A1 | 3/2012 | Sano et al. | |
| 2013/0241810 A1 | 9/2013 | Higashi et al. | |
| 2013/0242265 A1* | 9/2013 | Kato | G03B 21/16 |
| | | | 353/31 |
| 2014/0176862 A1 | 6/2014 | Uehara | |
| 2014/0218386 A1 | 8/2014 | Tatsuno et al. | |
| 2015/0364094 A1 | 12/2015 | Takasaki et al. | |
| 2015/0379498 A1 | 12/2015 | Baldwin et al. | |
| 2016/0035289 A1 | 2/2016 | Inada et al. | |
| 2016/0379498 A1 | 12/2016 | Aoki | |

FOREIGN PATENT DOCUMENTS

| | | |
|---|---|---|
| JP | 2009-15128 A | 1/2009 |
| JP | 2014-126716 A | 7/2014 |

\* cited by examiner

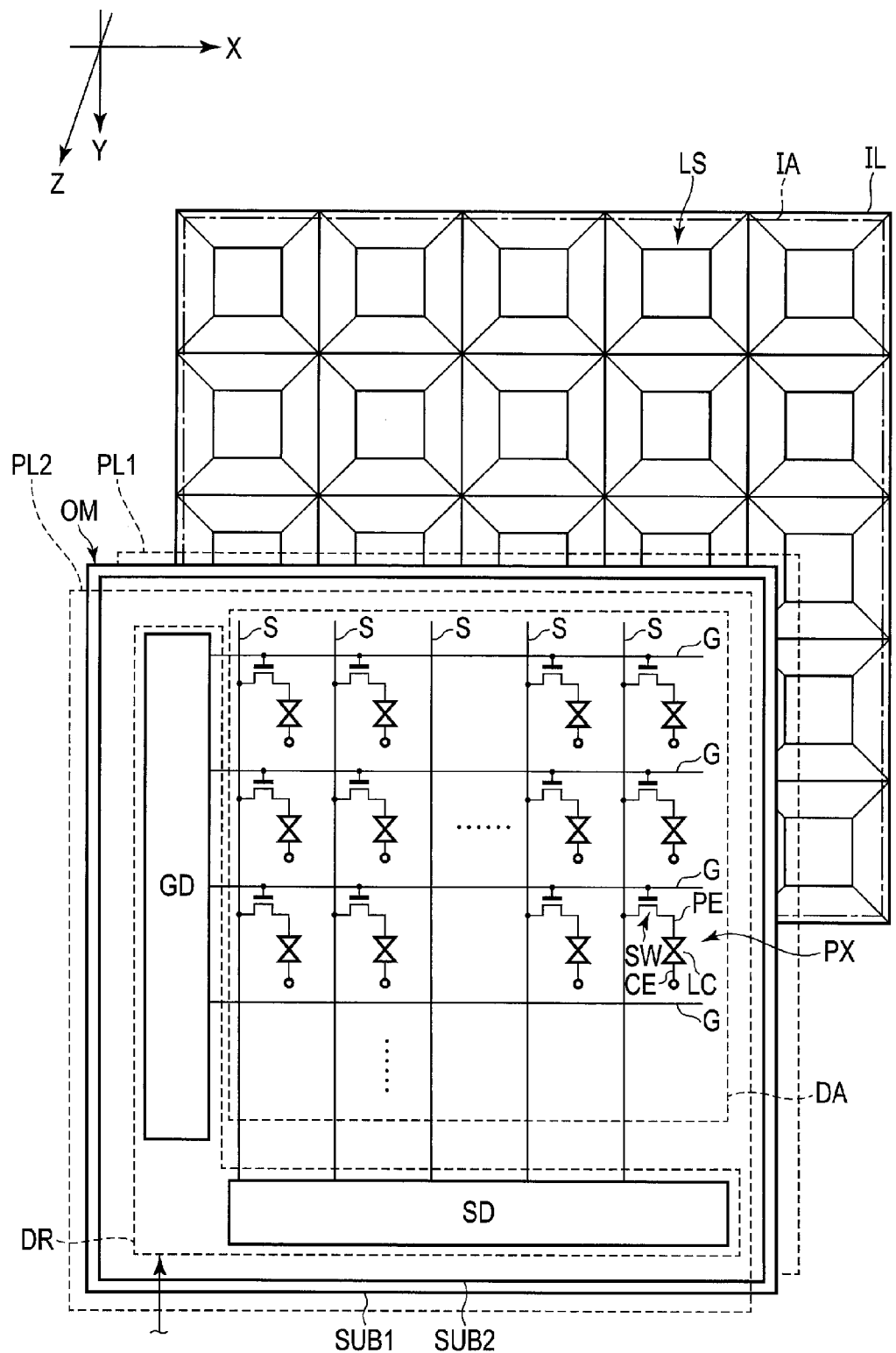
F I G. 7

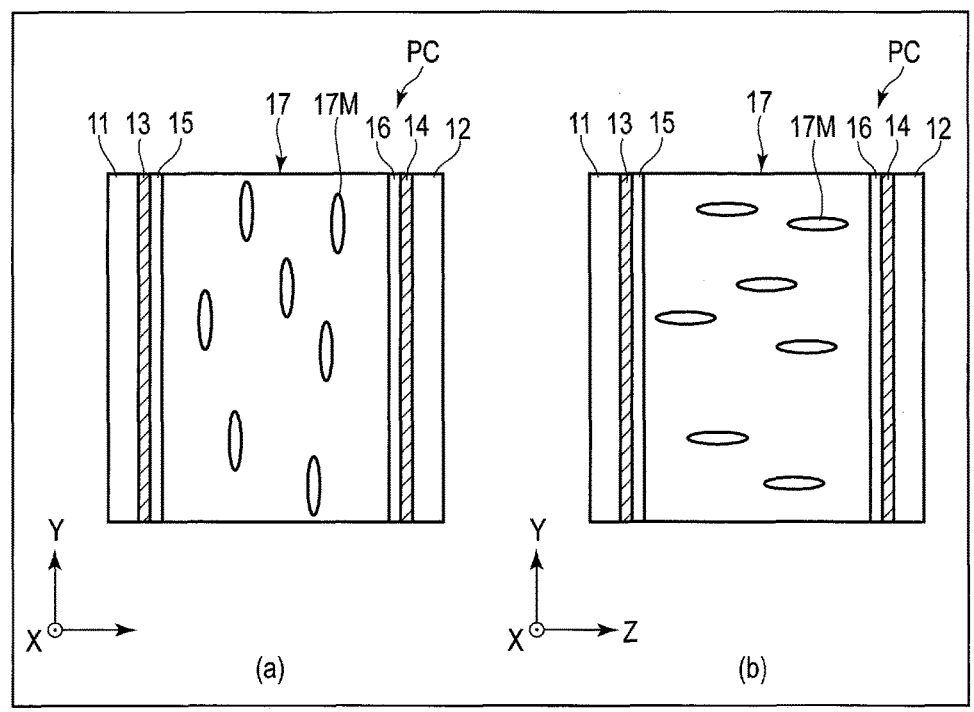
F I G. 8

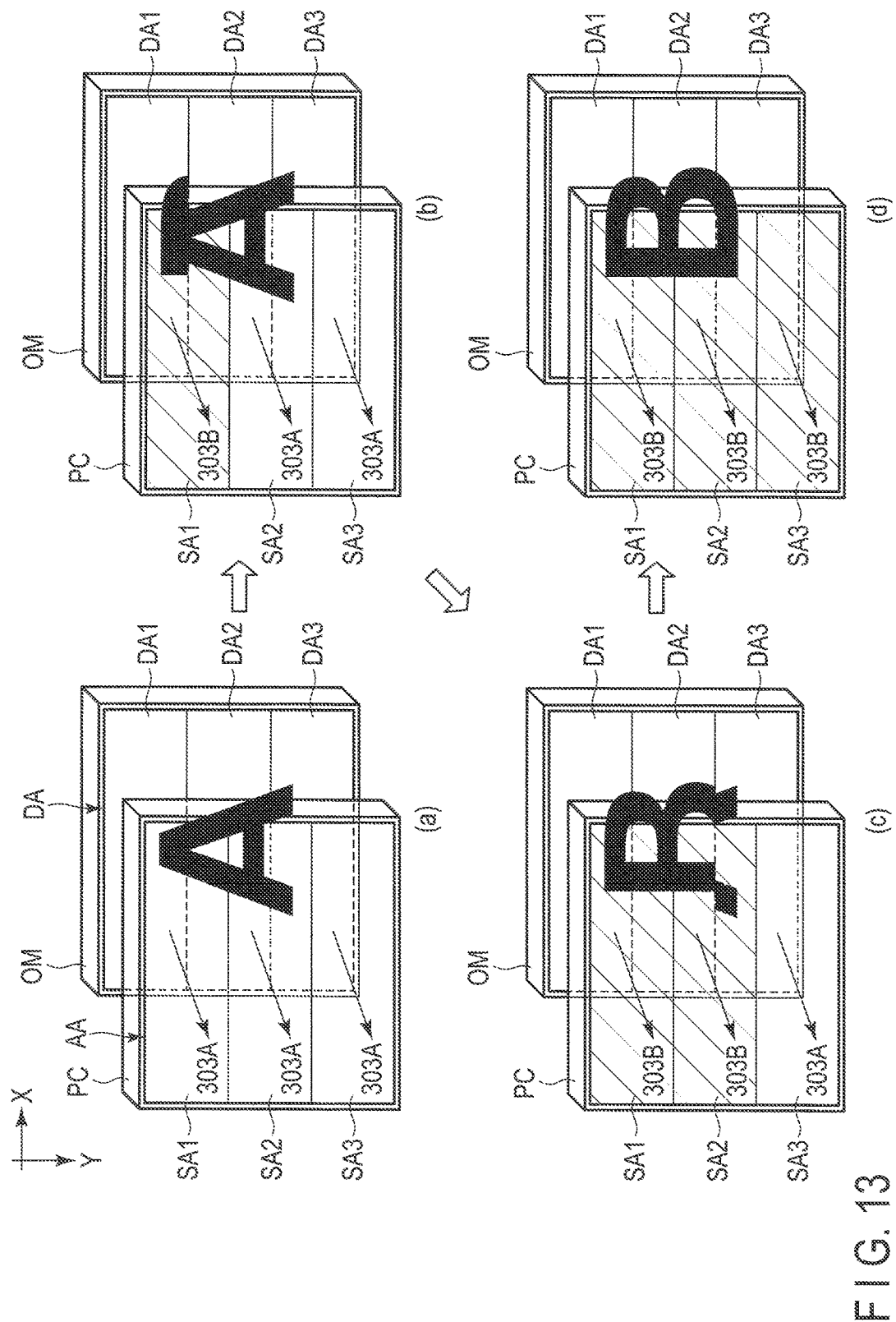
F I G. 13

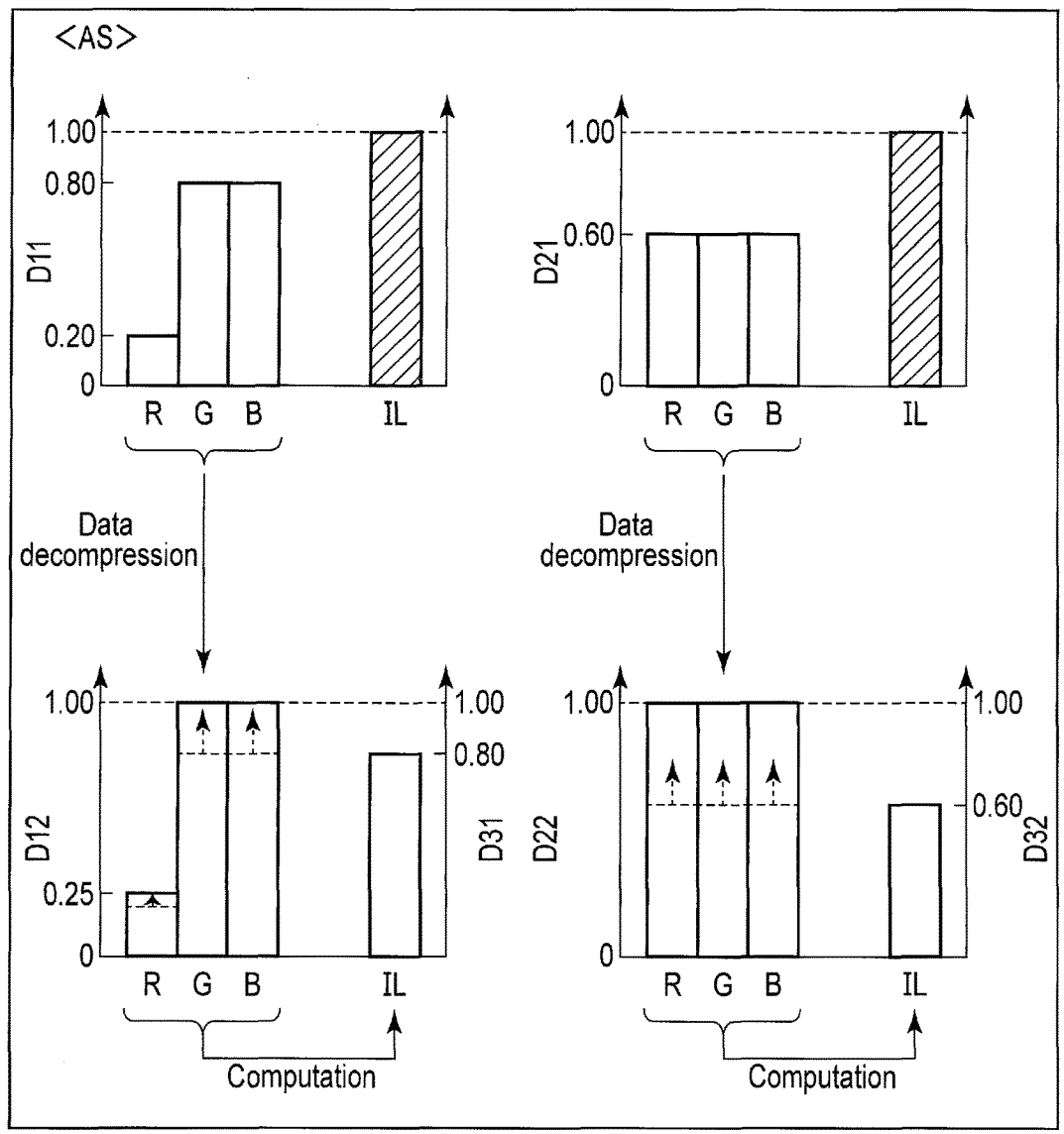
F I G. 21

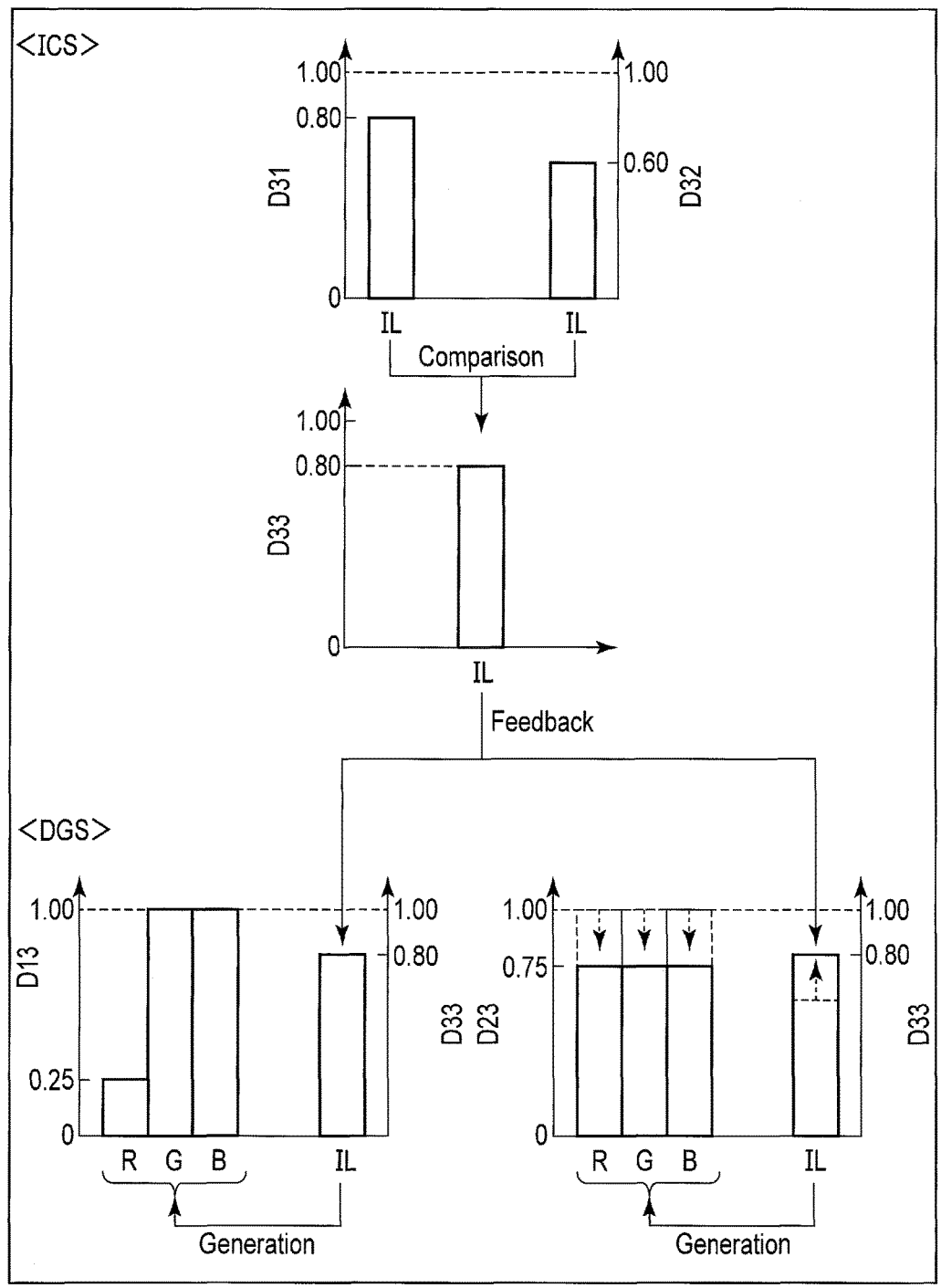
F I G. 22

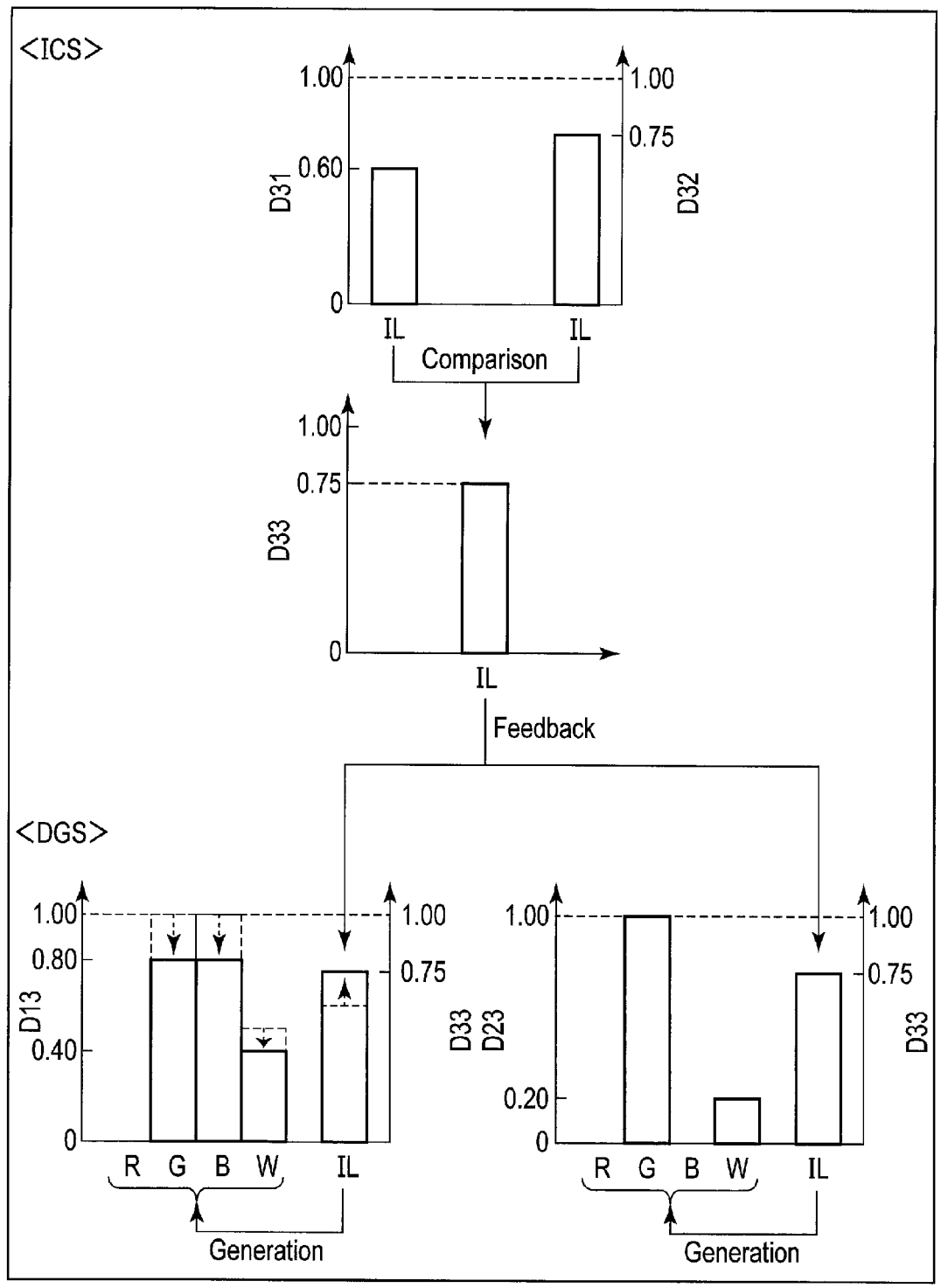
F I G. 24

DISPLAY DEVICE WITH A POLARIZATION CONTROL ELEMENT AND A POLARIZATION SEPARATION ELEMENT

CROSS-REFERENCE TO RELATED APPLICATIONS

This application is based upon and claims the benefit of priority from Japanese Patent Application No. 2016-213047, filed Oct. 31, 2016, the entire contents of which are incorporated herein by reference.

FIELD

Embodiments described herein relate generally to a display device.

BACKGROUND

As one of the display devices, a head-up display (which may be referred to as a HUD in the following) has been developed. In the HUD, an image displayed on a display panel is projected onto a windshield via a mirror. The projected image is visually recognized as a virtual image ahead of the windshield by an observer. The display panel to be applied in this projection displays an image by selectively transmitting light from a light source located at the back of the display panel, for example.

In the HUDs available recently, displaying various images at different positions is desired. If the size of the display panel is simply increased, the size of the light source for illuminating this display panel is also increased, which may cause an amount of generation of heat in the light source to be increased. Also, due to entry of external light in a unit of an optical system, the temperature in the unit may be increased. In addition, luminance of a virtual image is low as a result of a reflectance of a projection plane (for example, the windshield) being low. Therefore, if the brightness of the light source is enhanced in order to improve the visibility of the virtual image, the amount of heat generation of the light source may be increased. Such generation of heat by the HUD causes the optical system in the unit to be deformed, or the temperature of the space in which the HUD is mounted to be increased. Accordingly, a demand for suppressing the heat generation as much as possible is to be met. Also, making this type of HUD as small as possible structurally is demanded.

BRIEF DESCRIPTION OF THE DRAWINGS

FIG. 7 is an illustration showing a configuration example of an illumination device IL and an optical modulation element OM.

FIG. 8 is an illustration showing a configuration example of a polarization control element PC. FIG. 8(a) is a cross-sectional view of the polarization control element PC controlled in a first mode, and FIG. 8(b) is a cross-sectional view of the polarization control element PC controlled in a second mode.

FIGS. 12(a)-12(d) illustrate respective states of the display area.

FIG. 13 is an illustration for explaining an example of control for controlling an emission area AA of the polarization control element PC in accordance with an image displayed in the display area DA of the optical modulation element OM. FIGS. 13(a)-13(d) illustrate respective states of the display area.

FIG. 21 is an illustration showing one example of data processing in a computation module AS.

FIG. 22 is an illustration showing one example of data processing in an illumination controller ICS and a data generator DGS.

FIG. 23 is an illustration showing one example of data processing in a converter TS and the computation module AS.

FIG. 24 is an illustration showing one example of data processing in the illumination controller ICS and the data generator DGS.

DETAILED DESCRIPTION

Figure 1:
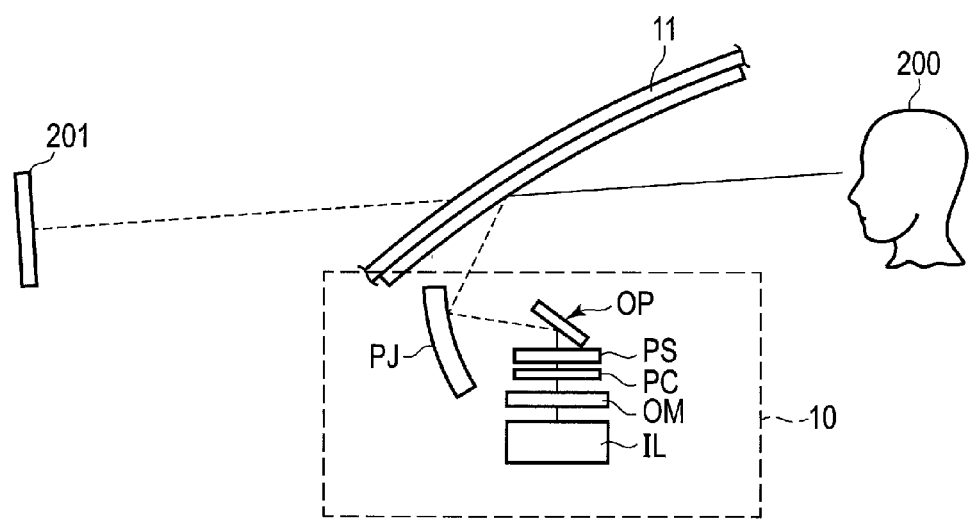
FIG. 1 is an illustration showing a basic structure of a display device 10 of the present embodiment in principle.

In general, according to one embodiment, a display device includes: an illumination device; an optical modulation element configured to emit image light corresponding to an image by using illumination light from the illumination device; a polarization control element configured to emit first polarized light, and second polarized light different from the first polarized light on the basis of the image light receiving from the optical modulation element; a polarization separation element configured to transmit the first polarized light as transmitted light and reflect the second polarized light as reflected light; and a projector configured to project the transmitted light onto a first projection area of a projection plane, and projects reflected light onto a second projection area different from the first projection area of the projection plane.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a basic structure of a display device 10 of the present embodiment in principle. The display device 10 of the illustrated example is a head-up display which uses a windshield of a vehicle, etc., as a projection plane (a screen) 11 for projection. Note that the projection plane 11 is not limited to a windshield, and other combiners may be used.

The display device 10 comprises an illumination device IL, an optical modulation element OM, a polarization control element PC, a polarization separation element PS, an optical system OP, and a projector PJ.

As will be described later, the illumination device IL comprises a plurality of light sources, and illuminates the optical modulation element OM. In one example, the optical modulation element OM is a transmissive element which displays an image by allowing illumination light from the illumination device IL to be transmitted selectively, and the illumination device IL is located at a rear side of the optical modulation element OM. Note that the optical modulation element OM may be a reflective element which displays an image by selectively reflecting the illumination light from the illumination device IL, in which case, the illumination device IL is located at a front side of the optical modulation element OM. As the optical modulation element OM, a transmissive or reflective liquid crystal device, micro-electromechanical systems (MEMS) such as a digital micromirror device (DMD), or the like, can be applied. In other words, the optical modulation element OM emits a image light corresponding to an image on the basis of the illumination light receiving from the illumination device IL.

The polarization control element PC is configured to emit first polarized light and second polarized light on the basis of the image light from the optical modulation element OM. Here, the first polarized light and the second polarized light have oscillation planes orthogonal to each other, and the first polarized light is referred to as p-polarized light, and the second polarized light is referred to as s-polarized light. Such a polarization control element PC includes, for example, a first sub-area and a second sub-area which are patterned in advance, and the first sub-area emits light from a first display area of the optical modulation element OM as the first polarized light, and the second sub-area emits light from a second display area of the optical modulation element OM as the second polarized light. In such a configuration example, the first sub-area comprises, for example, a retardation layer which imparts $\lambda/2$ retardation to the s-polarized light from the optical modulation element OM, and emits that light as the p-polarized light. In contrast, in the second sub-area, retardation is not imparted to the s-polarized light from the optical modulation element OM, and the light is emitted as the s-polarized light. Here, $\lambda$ indicates a wavelength of light incident on the polarization control element PC.

Further, as another example, the polarization control element PC may be configured such that the entire surface of an emission area of the polarization control element PC emits light from the display area as the first polarized light and the second polarized light alternately, in synchronization with an image displayed on the optical modulation element OM. In such a configuration example, the polarization control element PC is, for example, a liquid crystal element comprising a liquid crystal layer between a pair of electrode substrates, and controls retardation of the liquid crystal layer between an off-state in which a voltage is not applied to the liquid crystal layer and an on-state in which a voltage is applied to the liquid crystal layer. In the liquid crystal layer, a retardation $\Delta n \cdot d$ imparted to light which is transmitted through the liquid crystal layer is, for example, zero in the off-state and $\lambda/2$ in the on-state. Note that $\Delta n$ is the refractive anisotropy of the liquid crystal layer, d is the substantial thickness of the liquid crystal layer, and $\lambda$ is the wavelength of light incident on the liquid crystal layer.

The polarization separation element PS transmits the first polarized light emitted from the polarization control element PC, and reflects the second polarized light. As such a polarization separation element PS, a plate-like or cube-like polarization beam splitter, for example, can be applied.

The optical system OP comprises a mirror which guides the transmitted light and the reflected light separated by the polarization separation element PS to the projector PJ.

The projector PJ projects the transmitted light, which is the light transmitted through the polarization separation element PS, and the reflected light, which is the light reflected by the polarization separation element PS, onto the projection plane 11. For example, a concave mirror can be applied to such a projector PJ.

A user 200 who uses the display device 10 can visually recognize a virtual image 201 ahead of the projection plane 11.

Figure 2:
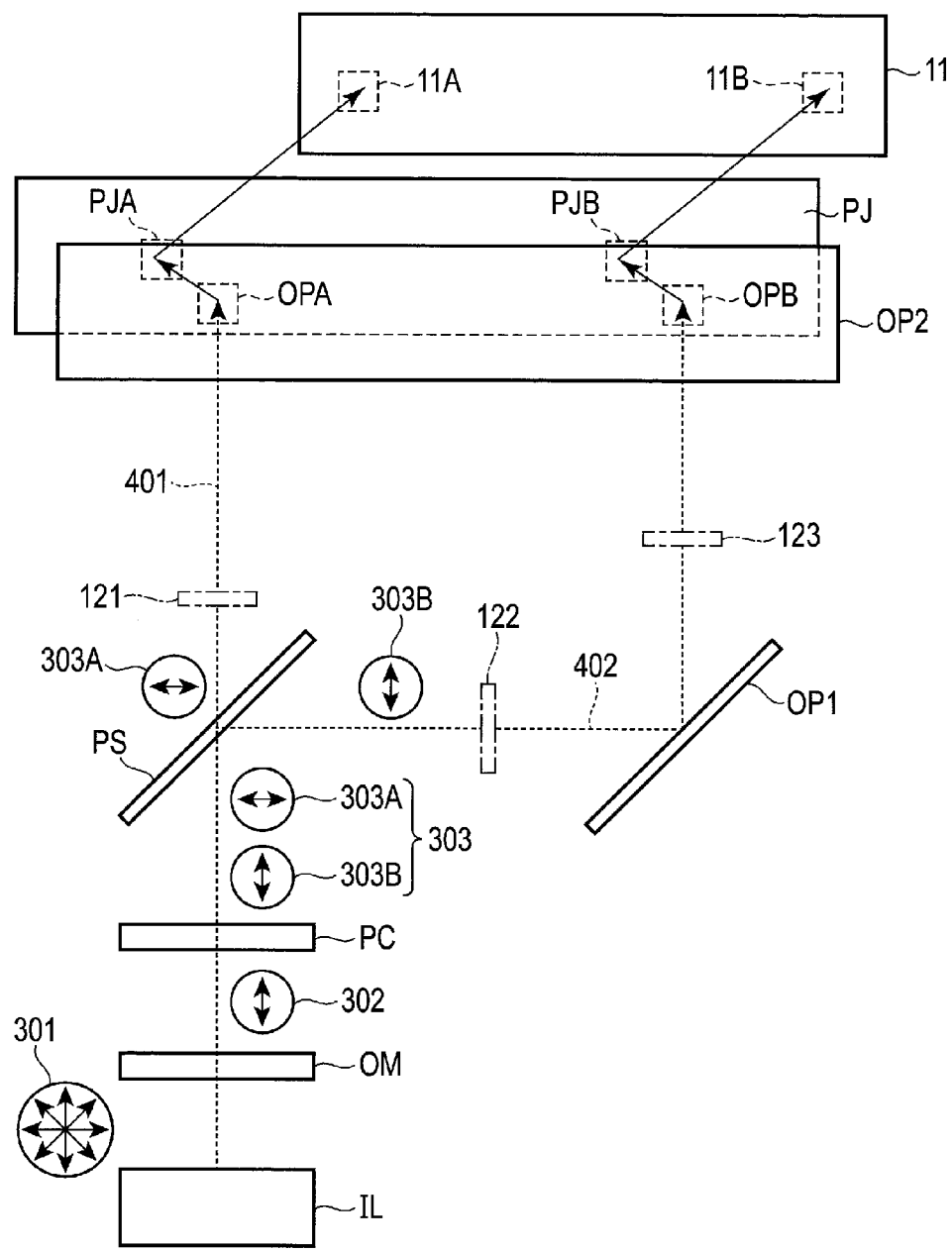
FIG. 2 is an illustration for explaining an optical path in the display device 10 shown in FIG. 1.

FIG. 2 is an illustration for explaining an optical path in the display device 10 shown in FIG. 1.

Illumination light 301 radiated from the illumination device IL is, for example, natural light, and has random oscillation planes. The optical modulation element OM is illuminated evenly by the illumination light 301 from the back. Light 302 which is transmitted through the optical modulation element OM, and is changed into an optical image is linearly polarized light having a predetermined oscillation plane, and is, for example, the second polarized light (s-polarized light). The light from the optical modulation element OM enters the polarization control element PC, retardation is imparted where necessary, and the entered light is emitted from the polarization control element PC as first polarized light 303A and second polarized light 303B.

Emitted light 303 from the polarization control element PC enters the polarization separation element PS. The polarization separation element PS transmits the first polarized light 303A and reflects the second polarized light 303B. More specifically, the polarization separation element PS separates the optical image formed by the light 302 from the optical modulation element OM into a first optical image formed by the first polarized light 303A and a second optical image formed by the second polarized light 303B.

A first optical path 401 in the figure indicates an optical path of the transmitted light, which is the light transmitted through the polarization separation element PS, to the projection plane 11, and a second optical path 402 indicates an optical path of the reflected light, which is the light reflected by the polarization separation element PS, to the projection plane 11. In the example illustrated, although the first optical path 401 and the second optical path 402 correspond to the optical paths of the first polarized light 303A and the second polarized light 303B, respectively, they are not limited to the above. For example, a retardation plate may be arranged in at least one point of a first position 121 in the first optical path 401, and a second position 122 and a third position 123 in the second optical path 402, between the polarization separation element PS and the projector PJ. When a retardation plate which imparts a retardation of λ/4 is arranged at one point in the first optical path 401, and one point in the second optical path 402, retardations are imparted to the first polarized light 303A and the second polarized light 303B in the first optical path 401 and the second optical path 402, respectively, and the first polarized light 303A and the second polarized light 303B are converted into circularly polarized light. Further, when a retardation plate which imparts a retardation of λ/2 is arranged at one point in the first optical path 401, the first polarized light 303A is converted into the second polarized light, and the oscillation planes can be made uniform in both of the first optical path 401 and the second optical path 402. For example, a user who uses polarized glasses can visually recognize either type of light since both of the transmitted light of the first optical path 401 and the reflected light of the second optical path 402 are converted into polarized light whose oscillation plane is nonparallel to an absorption axis of the polarized glasses, or circularly polarized light.

In the following explanation, light which passes through the first optical path 401 is merely referred to as the transmitted light, and light which passes through the second optical path 402 is merely referred to as the reflected light. However, in both cases, the polarization state is not considered.

The transmitted light and the reflected light are guided to the projector PJ. In the example illustrated, the reflected light is guided to a mirror OP2 after being reflected by a mirror OP1. The transmitted light is directly guided to the mirror OP2. In the mirror OP2, the transmitted light is guided to a first area OPA, and the reflected light is guided to a second area OPB different from the first area OPA. The mirror OP2 reflects each the transmitted light and the reflected light toward the projector PJ. In the projector PJ, the transmitted light is guided to a first area PJA, and the reflected light is guided to a second area PJB different from the first area PJA. The projector PJ projects the transmitted light and the reflected light onto different areas of the projection plane 11. On the projection plane 11, the transmitted light is projected onto a first projection area 11A, and the reflected light is projected onto a second projection area 11B different from the first projection area 11A. Each of the transmitted light (the first optical image) projected onto the first projection area 11A, and the reflected light (the second optical image) projected onto the second projection area 11B is visually recognized as a virtual image ahead of the projection plane 11 from the user 200, as shown in FIG. 1.

FIGS. 3A to 3F are illustrations each showing the display state of the optical image visually recognized by the display device 10 of the present embodiment. Note that FIGS. 3A to 3C correspond to examples in which the first projection area 11A and the second projection area 11B of the projection plane 11 are arranged on the right and left (i.e., horizontally) as seen from the user, and FIGS. 3D to 3F correspond to examples in which the first projection area 11A and the second projection area 11B are arranged up and down (i.e., vertically) as seen from the user.

Figure 3A:
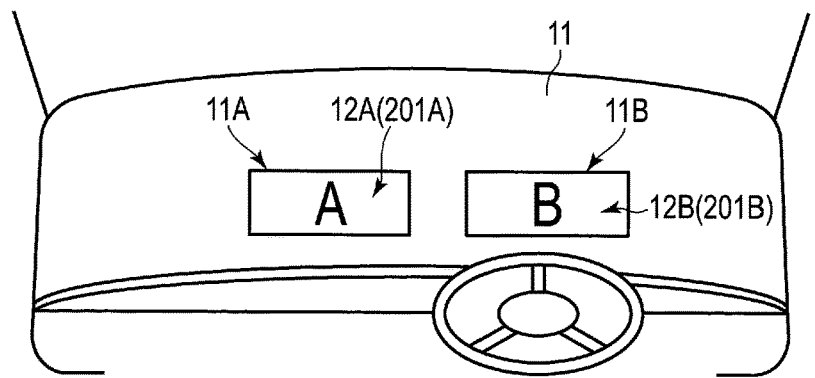
FIG. 3A is an illustration showing a display state of an optical image virtually recognized by the display device 10 of the present embodiment.

The example shown in FIG. 3A illustrates the state in which a first optical image 12A projected onto the first projection area 11A, and a second optical image 12B projected onto the second projection area 11B are arranged on the right and left and displayed. The user can visually recognize virtual images 201A and 201B corresponding to the first optical image 12A and the second optical image 12B, respectively.

Figure 3B:
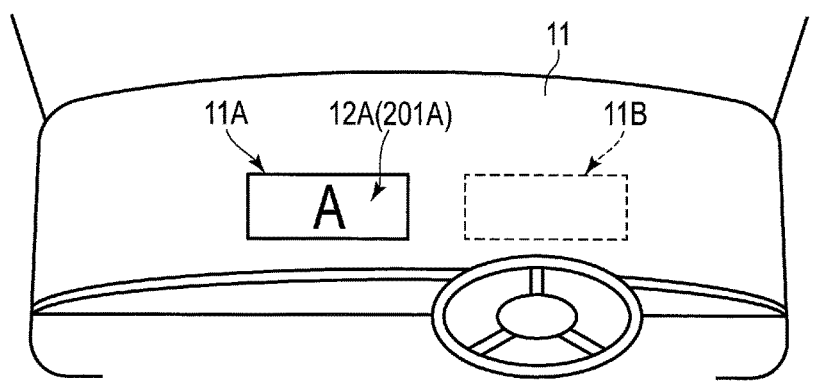
FIG. 3B is an illustration showing a display state of an optical image virtually recognized by the display device 10 of the present embodiment.

The example shown in FIG. 3B illustrates the state in which only the first optical image 12A projected onto the first projection area 11A is displayed. The user can visually recognize only the virtual image 201A corresponding to the first optical image 12A. Note that the second optical image in black display may be projected onto the second projection area 11B, or the light (reflected light) which forms the second optical image may be prevented from reaching the second projection area 11B.

Figure 3C:
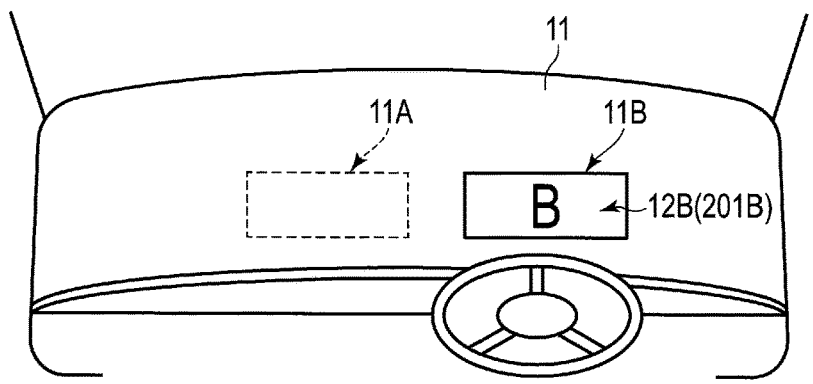
FIG. 3C is an illustration showing a display state of an optical image virtually recognized by the display device 10 of the present embodiment.

The example shown in FIG. 3C illustrates the state in which only the second optical image 12B projected onto the second projection area 11B is displayed. The user can visually recognize only the virtual image 201B corresponding to the second optical image 12B. Note that the first optical image in black display may be projected onto the first projection area 11A, or the light (transmitted light) which forms the first optical image may be prevented from reaching the first projection area 11A.

Figure 3D:
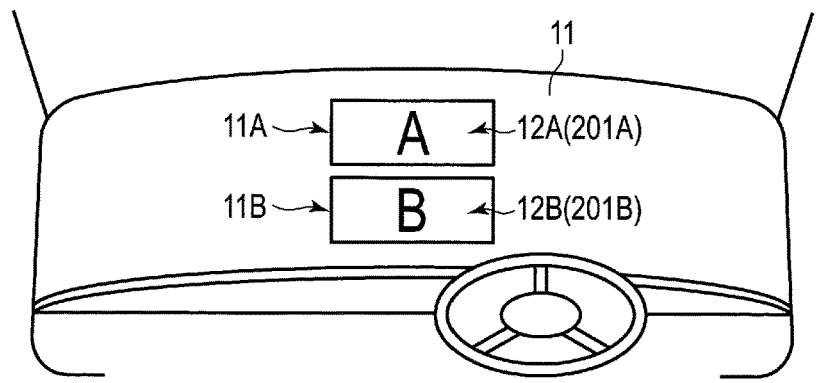
FIG. 3D is an illustration showing a display state of an optical image virtually recognized by the display device 10 of the present embodiment.

The example shown in FIG. 3D illustrates the state in which the first optical image 12A projected onto the first projection area 11A, and the second optical image 12B projected onto the second projection area 11B are arranged up and down and displayed. The user can visually recognize the virtual images 201A and 201B corresponding to the first optical image 12A and the second optical image 12B, respectively.

Figure 3E:
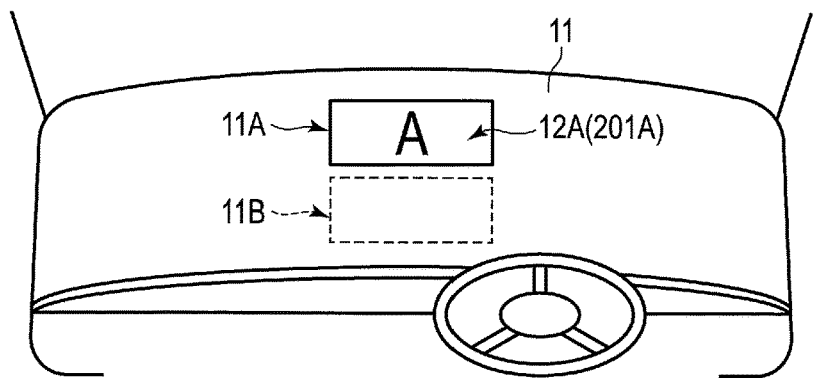
FIG. 3E is an illustration showing a display state of an optical image virtually recognized by the display device 10 of the present embodiment.
Figure 3F:
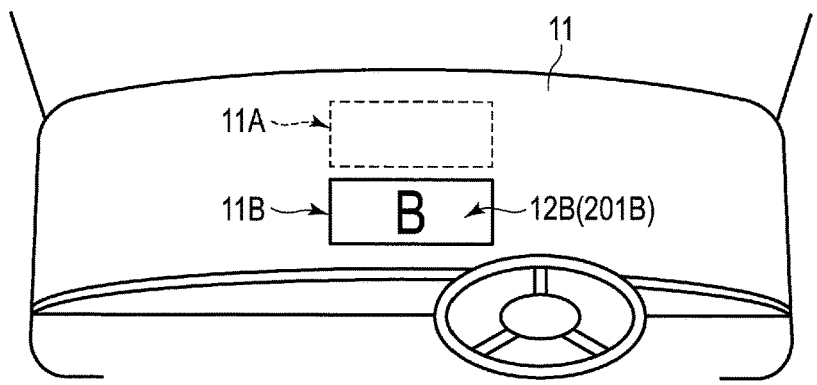
FIG. 3F is an illustration showing a display state of an optical image virtually recognized by the display device 10 of the present embodiment.

The example shown in FIG. 3E illustrates the state in which only the first optical image 12A projected onto the first projection area 11A is displayed. The user can visually recognize only the virtual image 201A corresponding to the first optical image 12A. The example shown in FIG. 3F illustrates the state in which only the second optical image 12B projected onto the second projection area 11B is displayed. The user can visually recognize only the virtual image 201B corresponding to the second optical image 12B.

In a head-up display, a sign, route guidance, a map, a meter, etc., are displayed as the first optical image 12A and the second optical image 12B.

Figure 4:
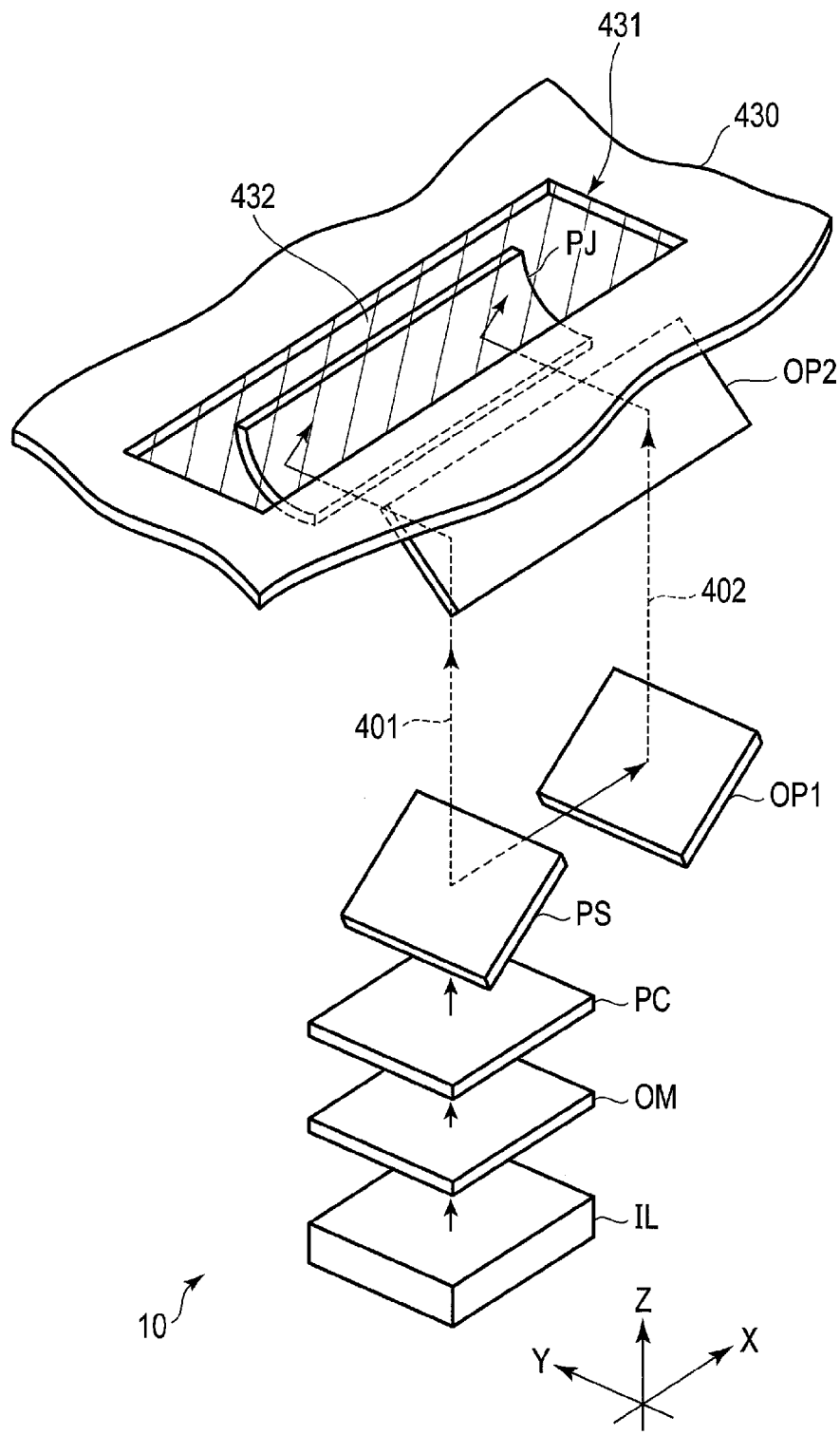
FIG. 4 is a perspective view showing an arrangement example of optical components which constitute the display device 10 according to the present embodiment.

FIG. 4 is a perspective view showing an arrangement example of optical components which constitute the display device 10 according to the present embodiment. While a first direction X, a second direction Y, and a third direction Z in the figure are orthogonal to each other, they may cross each other at an angle other than 90 degrees. An X-Y plane defined by the first direction X and the second direction Y is parallel to a main surface of the optical component such as the illumination device IL, and the third direction Z corresponds to a direction of travel of light radiated from the illumination device IL.

The display device 10 is arranged at a space portion ahead of the user. In one example, the display device 10 is arranged within a dashboard 430 located ahead of the user. A top board of the dashboard 430 is provided with an opening 431. At the opening 431, a cover member (a hatched portion in the FIG. 432 which is transparent is arranged. The cover member 432 is a glass plate, a resin plate, or the like.

The illumination device IL, the optical modulation element OM, the polarization control element PC, and the polarization separation element PS are arranged on the same straight line in this order along the third direction Z. The polarization separation element PS and the mirror OP1 are arranged in the first direction X. The mirror OP2 is a flat mirror extending in the first direction X, and is arranged in the third direction Z with respect to the polarization separation element PS and the mirror OP1. The projector PJ is arranged in the second direction Y with respect to the mirror OP2. The projector PJ is a concave mirror having a generatrix extending in the first direction X, and a concave curved surface as seen from the mirror OP2. The projector PJ is opposed to the cover member 432.

The first optical path 401 of the transmitted light, which is the light transmitted through the polarization separation element PS, to the projector PJ is parallel to the third direction Z between the polarization separation element PS and the mirror OP2, and is parallel to the second direction Y between the mirror OP2 and the projector PJ. The second optical path 402 of the reflected light, which is the light reflected by the polarization separation element PS, to the projector PJ is parallel to the first direction X between the polarization separation element PS and the mirror OP1, is parallel to the third direction Z between the mirror OP1 and the mirror OP2, and is parallel to the second direction Y between the mirror OP2 and the projector PJ.

The transmitted light of the first optical path 401 and the reflected light of the second optical path 402 are reflected by the projector PJ. The first optical image of the first optical path 401 and the second optical image of the second optical path 402 which are reflected are projected onto the projection plane, not shown, via the cover member 432.

Note that in the arrangement example shown in FIG. 4, the mirror OP2 may be omitted. More specifically, instead of arranging the mirror OP2, each of the constituent elements may be arranged such that light which has passed through the optical modulation element OM directly enters the projector PJ.

Figure 5:
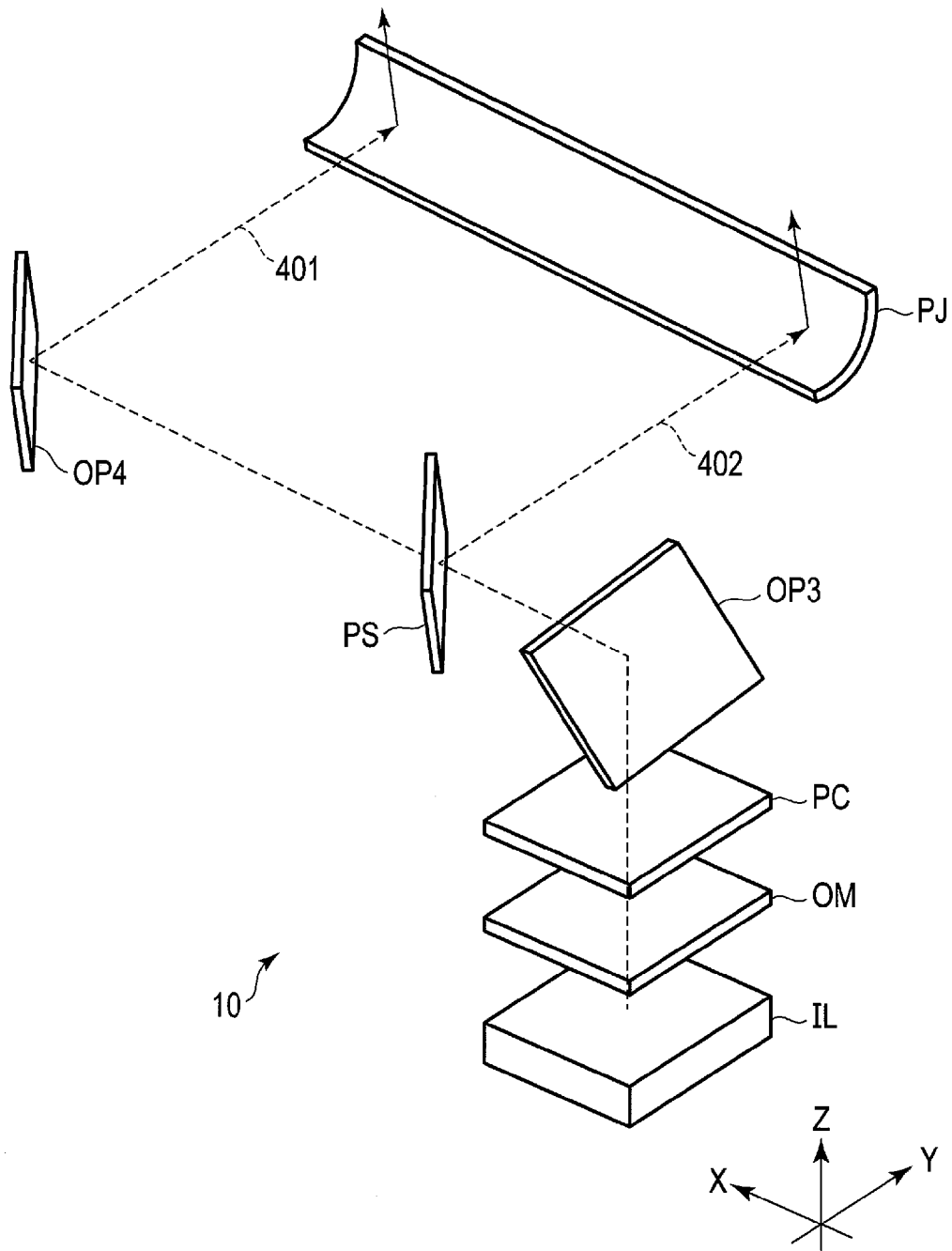
FIG. 5 is a perspective view showing another arrangement example of the optical components which constitute the display device 10 according to the present embodiment.

FIG. 5 is a perspective view showing another arrangement example of the optical components which constitute the display device 10 according to the present embodiment. Note that in the arrangement example illustrated, the same optical components as those of the arrangement example illustrated in FIG. 4 will be designated by the same reference numbers, and explanations of them will be omitted.

The illumination device IL, the optical modulation element OM, the polarization control element PC, and a mirror OP3 are arranged on the same straight line in this order along the third direction Z. The mirror OP3, the polarization separation element PS, and a mirror OP4 are arranged in this order in the first direction X. The projector PJ is arranged in the second direction Y with respect to the polarization separation element PS and the mirror OP4. The projector PJ is opposed to a cover member not shown.

Emitted light from the polarization control element PC is reflected in the first direction X by the mirror OP3. The first optical path 401 of the transmitted light, which is the light transmitted through the polarization separation element PS, to the projector PJ is parallel to the first direction X between the polarization separation element PS and the mirror OP4, and is parallel to the second direction Y between the mirror OP4 and the projector PJ. The second optical path 402 of the reflected light, which is the light reflected by the polarization separation element PS, to the projector PJ is parallel to the second direction Y between the polarization separation element PS and the projector PJ.

The transmitted light of the first optical path 401 and the reflected light of the second optical path 402 are projected onto the projection plane via a cover member not shown.

The arrangement example shown in FIG. 5 enables the cost and size to be reduced as compared to the arrangement example shown in FIG. 4 since a large optical component such as the mirror OP2 is not required.

Note that in the arrangement example shown in FIG. 5, the mirror OP3 may be omitted. More specifically, the illumination device IL may be arranged such that the illumination device IL and the polarization control element PC are aligned in the first direction X. By doing so, a space along the third direction Z can be reduced, and further reduction in size is enabled.

Note that in the arrangement examples illustrated in FIGS. 4 and 5, the projector PJ is a single concave mirror to which light of the first optical path 401 and the second optical path 402 are both guided. However, the projector PJ is not limited to the example illustrated. Note that the projector PJ may be constituted by two concave mirrors to which light of the first optical path 401 and light of the second optical path 402 are guided separately, as will be explained by referring to FIG. 6.

Figure 6:
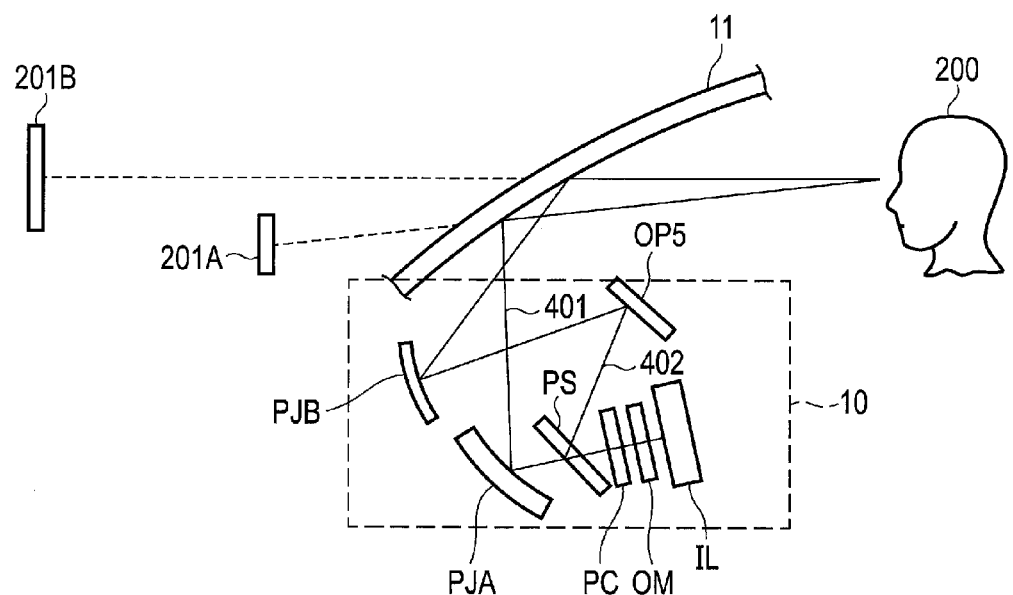
FIG. 6 is an illustration showing yet another arrangement example of the optical components which constitute the display device 10 according to the present embodiment.

FIG. 6 is an illustration showing yet another arrangement example of the optical components which constitute the display device 10 according to the present embodiment. The arrangement example illustrated is different from the examples illustrated in FIGS. 4 and 5 in that the projector PJ comprises a first concave mirror PJA and a second concave mirror PJB. The first concave mirror PJA is located between the polarization separation element PS and the projection plane 11 in the first optical path 401. The second concave mirror PJB is located between a mirror OP5 and the projection plane 11 in the second optical path 402.

Light transmitted through the polarization separation element PS travels through the first optical path 401, is made incident on the first concave mirror PJA, and is projected onto the projection plane 11. Meanwhile, light reflected from the polarization separation element PS travels through the second optical path 402, is made incident on the second concave mirror PJB after being reflected by the mirror OP5, and is projected onto the projection plane 11.

According to the arrangement example shown in FIG. 6, by adjusting, for example, an angle of elevation of the first concave mirror PJA and the second concave mirror PJB, projection positions of the first optical image and the second optical image can be adjusted. Also, when an optical path length (first optical path length) from the first concave mirror PJA to the projection plane 11 is different from an optical path length (second optical path length) from the second concave mirror PJB to the projection plane 11, image forming positions of the two virtual images 201A and 201B can be made different from each other. In the example illustrated, the virtual image 201B corresponding to the second optical image is visually recognized at a position far from the user 200 than is the virtual image 201A corresponding to the first optical image. If at least one of the first concave mirror PJA and the second concave mirror PJB is movable, the image forming position of the optical image can be changed according to the user's demand. Also, the image forming position of the optical image can be changed automatically according to the speed of a vehicle in which the present display device 10 is mounted or the use environment.

According to the present embodiment described above, in the display device 10 comprising one illumination device IL and one optical modulation element OM, several kinds of different images can be projected and displayed on different areas of the projection plane 11. Moreover, any one of these different images can be selected and displayed, or all of them can be displayed simultaneously. That is, the display device 10 can be made small and also enables the image to be displayed more extensively as compared to the area of the display area of the optical modulation element OM. Accordingly, various images can be displayed.

Also, the illumination device IL can be downsized to such a scale that the display area of the optical modulation element OM can be illuminated. Further, in a case where an image is selectively displayed on the projection plane 11, the amount of heat generation of the illumination device IL in light of the whole area allowing the images to be displayed can be reduced.

Next, a configuration example of the illumination device IL and the optical modulation element OM which can be applied to the present embodiment will be described.

FIG. 7 is an illustration showing a configuration example of the illumination device IL and the optical modulation element OM. The optical modulation element OM of the illustrated example is a liquid crystal display panel, and includes a first substrate SUB1, a second substrate SUB2, and a liquid crystal layer LC which is held between the first substrate SUB1 and the second substrate SUB2. A polarizer PL1 is located on a rear side of the first substrate SUB1. A polarizer PL2 is located on a front side of the second substrate SUB2. For example, absorption axes of the polarizer PL1 and the polarizer PL2 are orthogonal to each other in the X-Y plane. A transmission axis of the polarizer PL2 is parallel to an oscillation plane of the light (second polarized light) 302 explained with reference to FIG. 2.

The optical modulation element OM includes a display area DA in which an image is displayed. The optical modulation element OM comprises a plurality of pixels PX arrayed in a matrix in the first direction X and the second direction Y within the display area DA. The first substrate SUB1 comprises scanning lines G (also referred to as gate lines) and signal lines S (also referred to as data lines or source lines) intersecting the scanning lines G. A driver DR which drives the pixels PX includes a scanning line driver GD and a signal line driver SD. Each of the scanning lines G is drawn outside the display area DA, and is connected to the scanning line driver GD. Each of the signal lines S is drawn outside the display area DA, and is connected to the signal line driver SD. The scanning line driver GD and the signal line driver SD are controlled based on image data for displaying an image in the display area DA.

Each of the pixels PX comprises a switching element SW (for example, a thin-film transistor), a pixel electrode PE, a common electrode CE, and the like. The switching element SW is electrically connected to the scanning line G and the signal line S. The pixel electrode PE is electrically connected to the switching element SW. The common electrode CE is opposed to a plurality of pixel electrodes PE. The pixel electrode PE and the common electrode CE function as drive electrodes which drive the liquid crystal layer LC. The pixel electrode PE and the common electrode CE are formed of, for example, a transparent conductive material such as indium tin oxide (ITO) or indium zinc oxide (IZO).

The illumination device IL includes an illumination area IA opposed to the display area DA. The illumination device IL comprises light sources LS arrayed in a matrix in the first direction X and the second direction Y in the illumination area IA. Although the light source LS is a light-emitting diode which emits white light, for example, the light source LS is not limited to this. As the light source LS which emits white light, a light source structured by combining light-emitting diodes which emit red, green, and blue light as one chip, or a light source structured by combining a light-emitting diode which emits blue or near-ultraviolet light and a phosphor, for example, can be applied. The brightness of such a light source LS can be controlled in accordance with the magnitude of a current to be supplied.

In one example, one light source LS is arranged to be opposed to a sub-display area formed of m×n pixels PX. In the above, m and n are positive integers, m corresponds to the number of pixels PX arranged in the first direction X, and n corresponds to the number of pixels PX arranged in the second direction Y. Turning on and off of the light sources LS can be controlled individually. Accordingly, in the illumination area IA, the illumination device IL can include sub-illumination areas where lighting and turning off of the light can be controlled individually. Each of the sub-illumination areas comprises at least one light source LS. The sub-illumination areas can be formed variously, such as in a strip shape extending in the first direction X, a strip shape extending in the second direction Y, and in a matrix arranged in the first direction X and the second direction Y, in the X-Y plane.

Next, a configuration example of the polarization control element PC which is applicable to the present embodiment will be described.

FIG. 8 is an illustration showing a configuration example of the polarization control element PC. FIG. 8(a) is a cross-sectional view of the polarization control element PC controlled in a first mode, and FIG. 8(b) is a cross-sectional view of the polarization control element PC controlled in a second mode.

The polarization control element PC comprises support substrates 11 and 12, a control electrode (a first electrode) 13, a control electrode (a second electrode) 14, alignment films 15 and 16, and a liquid crystal layer 17. The control electrode 13 is located between the support substrate 11 and the alignment film 15, and the control electrode 14 is located between the support substrate 12 and the alignment film 16. The liquid crystal layer 17 is located between the alignment films 15 and 16, in other words, between the control electrode 13 and the control electrode 14. Each of the support substrates 11 and 12 is a substrate such as a glass substrate or a resin substrate, which is transparent to visible light. The control electrodes 13 and 14 are formed of a transparent conductive material such as ITO or IZO. The liquid crystal layer 17 includes liquid crystal molecules 17M of a nematic liquid crystal, for example. Note that as the liquid crystal layer 17, either a structure having positive dielectric anisotropy or a structure having negative dielectric anisotropy can be applied. As the alignment films 15 and 16, a horizontal alignment film having the alignment restriction force of aligning the liquid crystal molecules 17M in a direction parallel to a main surface, or a vertical alignment film having the alignment restriction force of aligning the liquid crystal molecules 17M in a direction parallel to a normal of the main surface may be applied.

In the first mode shown in FIG. 8(a), the liquid crystal molecules 17M are aligned in such a direction that their major axes are parallel to the main surface (in other words, the X-Y plane). In this case, retardation which is imparted to light transmitted through the liquid crystal layer 17 along the third direction Z is, for example, $\lambda/2$, and linearly polarized light transmitted through the liquid crystal layer 17 is converted into linearly polarized light which is polarized such that the polarization axis is rotated by 90 degrees in the X-Y plane. In this first mode, the polarization control element PC emits the second polarized light from the optical modulation element OM, for example, as the first polarized light.

In the second mode shown in FIG. 8(b), the liquid crystal molecules 17M are aligned in such a direction that their major axes are parallel to the third direction Z. In this case, retardation which is imparted to the light transmitted through the liquid crystal layer 17 along the third direction Z is zero, and the linearly polarized light transmitted through the liquid crystal layer 17 maintains its polarization state. In this second mode, the polarization control element PC emits the second polarized light from the optical modulation element OM, for example, as the second polarized light.

Note that although the control electrodes 13 and 14 are located on both sides of the liquid crystal layer 17 in the example of the polarization control element PC shown in FIG. 8, the control electrodes 13 and 14 may both be located on one side of the liquid crystal layer 17. For example, both of the control electrodes 13 and 14 may be arranged between the support substrate 11 and the liquid crystal layer 17, and the alignment of the liquid crystal molecules 17M may be controlled by using an electric field produced between the control electrodes 13 and 14.

Figure 9:
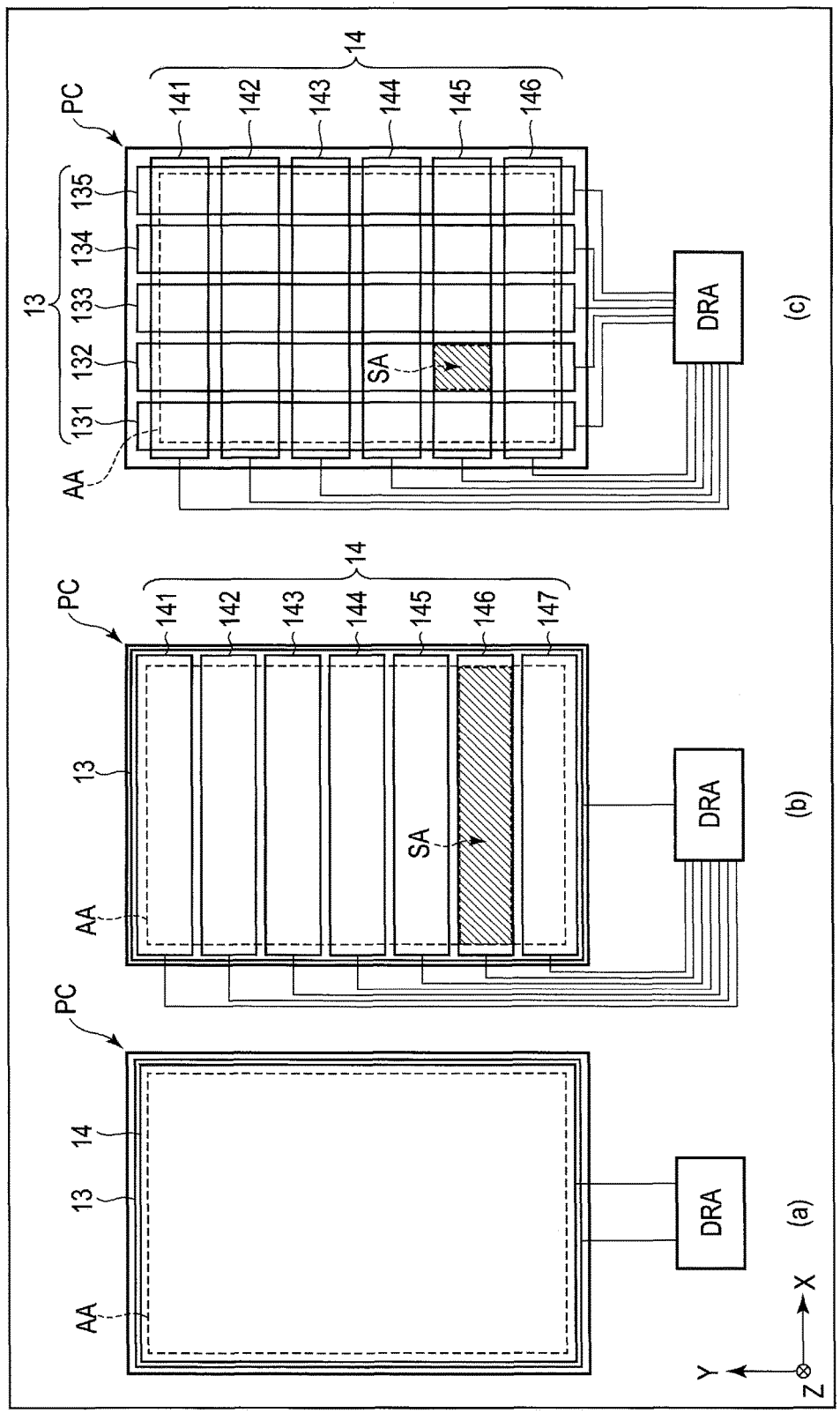
FIG. 9 is a plan view showing-a configuration examples FIGS. 9(a)-9(c) of the polarization control element PC.

FIG. 9 is a plan view showing a configuration example of the polarization control element PC. The polarization control element PC includes an emission area AA in the X-Y plane. In one example, the emission area AA is formed in a rectangular shape having short sides along the first direction X and long sides along the second direction Y. However, the shape is not limited to the illustrated example, and the emission area AA may be formed in the other polygonal shape, or may be circular or elliptical, for example. Such an emission area AA is configured to emit light from the optical modulation element OM as the first polarized light and the second polarized light as described above.

In the configuration example illustrated in FIG. 9(a), each of the control electrodes 13 and 14 is constituted of a single sheet electrode extending over the entire surface of the emission area AA without having discontinuity. As described above, the control electrodes 13 and 14 are opposed to each other with the liquid crystal layer 17 interposed between the control electrodes 13 and 14. A driver DRA is electrically connected to each of the control electrodes 13 and 14. In such a configuration example, as the driver DRA controls a voltage to be applied to the control electrodes 13 and 14, the alignment direction of the liquid crystal molecules 17M of the liquid crystal layer 17 is controlled on the entire surface of the emission area AA. Thereby, the polarization control element PC can control the mode between the first mode (i.e., a mode in which the light is emitted mainly as the first polarized light) and the second mode (i.e., a mode in which the light is emitted mainly as the second polarized light) on the entire surface of the emission area AA.

The configuration example shown in FIG. 9(b) is different from the configuration example in FIG. 9(a) in that the emission area AA includes strip-shaped sub-emission areas SA. The control electrode 13 is constituted of a single sheet electrode as in the configuration example illustrated in FIG. 9(a). The control electrode 14 is constituted of a plurality of strip electrodes 141 to 147 which are spaced apart from each other. In the example illustrated, the strip electrodes 141 to 147 are each formed in a rectangular shape extending in the first direction X, and are arranged to be spaced apart from each other in the second direction Y. The control electrode 13 and the strip electrodes 141 to 147 are opposed to each other. The driver DRA is electrically connected to the control electrode 13, and also to each of the strip electrodes 141 to 147. Each of the sub-emission areas SA corresponds to an overlapping portion where the control electrode 13 and one of the strip electrodes 141 to 147 overlap each other in the X-Y plane. In other words, in the example illustrated, each sub-emission area SA is a strip-shaped area extending in the first direction X.

Note that the strip electrodes 141 to 147 may each extend in the second direction Y, and be arranged to be spaced apart from each other in the first direction X. Further, the configuration example indicated above corresponds to a case where one of the control electrodes 13 and 14 is constituted of a sheet electrode, and the other control electrode is constituted of the strip electrodes. Thus, the control electrode 13 may alternatively be constituted of a plurality of strip electrodes, and the control electrode 14 may be constituted of a single sheet electrode.

In such a configuration example, as the driver DRA controls a voltage to be applied to each of the strip electrodes 141 to 147, the alignment direction of the liquid crystal molecules 17M is controlled in each of the sub-emission areas SA. In this way, the polarization control element PC can control the mode between the first mode and the second mode for each of the sub-emission areas SA. Note that in the polarization control element PC of this configuration example, by driving all of the strip electrodes 141 to 147 together, control of the mode between the first mode and the second mode can be performed on the entire surface of the emission area AA.

The configuration example shown in FIG. 9(c) is different from the configuration example in FIG. 9(a) in that the emission area AA includes the sub-emission areas SA arranged in a matrix. The control electrode 13 is constituted of a plurality of strip electrodes 131 to 135 which are spaced apart from each other. The control electrode 14 is constituted of a plurality of strip electrodes 141 to 146 which are spaced apart from each other. In the example illustrated, the strip electrodes 131 to 135 each extend in the second direction Y, and are spaced apart from each other in the first direction X. Also, the strip electrodes 141 to 146 each extend in the first direction X, and are spaced apart from each other in the second direction Y. The strip electrodes 131 to 135 and the strip electrodes 141 to 146 are opposed to each other. The driver DRA is electrically connected to each of the strip electrodes 131 to 135 and each of the strip electrodes 141 to 146. Each of the sub-emission areas SA corresponds to a rectangular crossover portion where one of the strip electrodes 131 to 135 and one of the strip electrodes 141 to 146 cross each other in the X-Y plane. In other words, in the example illustrated, the sub-emission areas SA are arranged in a matrix in the first direction X and the second direction Y.

In such a configuration example, as the driver DRA controls a voltage to be applied to each of the strip electrodes 131 to 135 and the strip electrodes 141 to 146, the alignment direction of the liquid crystal molecules 17M is controlled in each of the sub-emission areas SA. In this way, the polarization control element PC can control the mode between the first mode and the second mode for each of the sub-emission areas SA. Note that in the polarization control element PC of this configuration example, by driving all of the strip electrodes 131 to 135 and the strip electrodes 141 to 146 together, control of the mode between the first mode and the second mode can be performed on the entire surface of the emission area AA.

In each of the above configuration examples, the shape of the sub-emission area SA is not limited to a rectangle. That is, the sub-emission area SA may be formed in the other polygonal shape, a circular or elliptical shape, or an arbitrary shape. The shapes of the control electrodes 13 and 14 which define the shape of the sub-emission area SA as described above can be selected freely. The number of strip electrodes which constitute the control electrodes 13 and 14 is not limited to that of the example illustrated.

<<Time-division Driving Method>>

Next, a time-division driving method will be described. Here, a case where the first optical image 12A of a first image "A" and a second optical image 12B of a second image "B" are projected onto the first projection area 11A and the second projection area 11B of the projection plane 11, respectively, will be described. Note that the positions on which these first optical image 12A and the second optical image 12B are projected may be those that are arranged on the right and left of the projection plane 11 (for example, FIGS. 3A to 3C), or those that are arranged up and down on the projection plane 11 (for example, FIGS. 3D to 3F).

Figure 10:
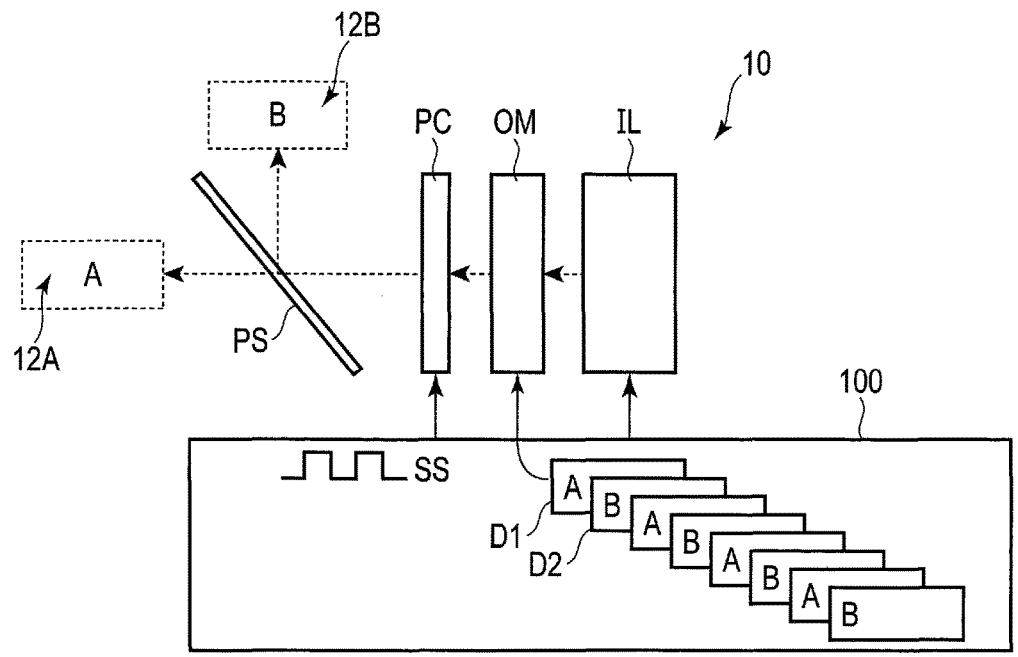
FIG. 10 is an illustration showing a configuration example of the display device 10 to which a time-division driving method is applied.

FIG. 10 is an illustration showing a configuration example of the display device 10 to which the time-division driving method is applied. In the display device 10, a main controller 100 controls each of the illumination device IL, the optical modulation element OM, and the polarization control element PC. The main controller 100 inputs first image data D1 corresponding to the first image, and second image data D2 corresponding to the second image, sequentially to the optical modulation element OM. Also, the main controller 100 computes brightness necessary for illumination based on each item of the first image data D1 and the second image data D2, and drives the illumination device IL based on the brightness data which has been generated. Also, in synchronization with display of each of the first image and the second image on the optical modulation element OM, the main controller 100 inputs a switching signal SS for switching between the first mode and the second mode (or the polarization state of the emission light) to the polarization control element PC.

The optical modulation element OM displays an image corresponding to the image data on the display area DA as the image data is input to the driver DR shown in FIG. 7. That is, the optical modulation element OM displays the first image on the display area DA by the input of the first image data D1, and displays the second image on the display area DA by the input of the second image data D2. The optical modulation element OM displays the first image and the second image alternately on the display area DA as the first image data D1 and the second image data D2 are input alternately. In other words, the optical modulation element OM emits first image light corresponding to the first image data D1 and second image light corresponding to the second image data D2 on the basis of illumination light receiving from the illumination device IL.

As the switching signal SS is input to the driver DRA shown in FIG. 9(a), the polarization control element PC switches the mode between the first mode and the second mode on the entire surface of the emission area AA. More specifically, in synchronization with the display of the first image on the display area DA, the emission area AA is switched to be in the first mode, and the polarization control element PC emits the second polarized light from the display area DA as the first polarized light. Further, in synchronization with the display of the second image on the display area DA, the emission area AA is switched to be in the second mode, and the polarization control element PC emits the second polarized light from the display area DA as the second polarized light.

As described above, the first polarized light is transmitted through the polarization separation element PS, and the transmitted light passes through the first optical path 401 and is projected onto the first projection area 11A of the projection plane 11 as the first optical image 12A. Also, the second polarized light is reflected by the polarization separation element PS, and the reflected light passes through the second optical path 402 and is projected onto the second projection area 11B of the projection plane 11 as the second optical image 12B. When the frame frequency of displaying the image is, for example, 60 Hz, by alternately projecting the first optical image 12A and the second optical image 12B at 120 Hz, the user is allowed to visually recognize the first optical image 12A and the second optical image 12B substantially simultaneously (FIG. 3A or 3D). Note that the switching of the projection timing of the first optical image 12A and the second optical image 12B is not limited to the above example. For example, after projecting the first optical image 12A continuously during a certain period, and causing the user to visually recognize only the first optical image 12A (FIG. 3B or 3E), the second optical image 12B may be projected so that the user can visually recognize only the second optical image 12B (FIG. 3C or 3F).

Figure 11:
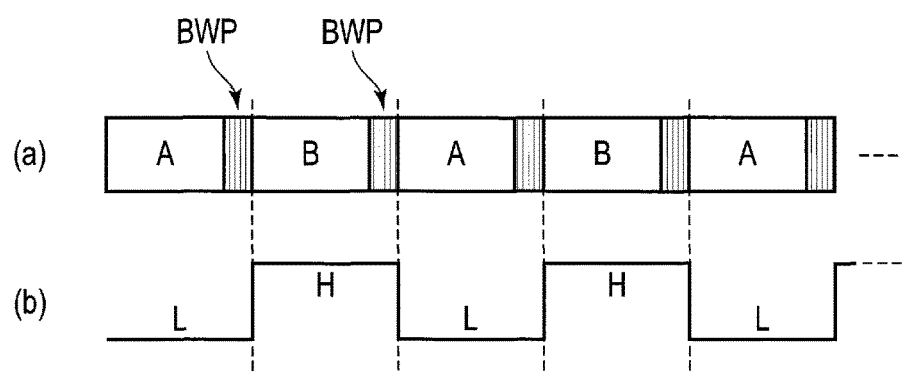
FIG. 11 is an illustration for explaining an example of control of the display device to which the time-division driving method is applied. The time series FIG. 11(a) of the first image data D1 and the second image data D2 which are input to the optical modulation element OM, and the time series FIG. 11(b) of the switching signal SS input to the polarization control element PC are shown.

FIG. 11 is an illustration for explaining an example of control of the display device to which the time-division driving method is applied. Here, time series (a) of the first image data D1 and the second image data D2 which are input to the optical modulation element OM, and time series (b) of the switching signal SS input to the polarization control element PC are shown. The switching signal SS is at a low level L during a period in which the first image data D1 is input, and is at a high level H during a period in which the second image data D2 is input. When the switching signal SS is at the low level L, the emission area AA of the polarization control element PC is set in the first mode, and when the switching signal SS is at the high level H, the emission area AA of the polarization control element PC is set in the second mode.

In the example illustrated, a blanking period BWP is set between the period in which the first image data D1 is input to the optical modulation element OM, and the period in which the second image data D2 is input to the optical modulation element OM. The blanking period BWP is a period in which black image data for displaying a black image is input to the optical modulation element OM. One frame period, for example, is set as such a blanking period BWP.

For example, when the image is switched from the first image A to the second image B in the optical modulation element OM, if a write start time of the second image data D2 for the second image matches a mode switching time of the polarization control element PC by not providing the blanking period BWP, the following problem may be encountered. That is, immediately after the writing of the second image data D2 to the optical modulation element OM has been started, a part of the first image A is still displayed on the optical modulation element OM. In this state, when the polarization control element PC is switched from the first mode to the second mode, light which displays a part of the first image A is projected onto the second projection area 11B through the second optical path 402. That is, while the first optical image 12A of the first image A should have been projected onto the first projection area 11A, a part of the first optical image 12A is projected onto the second projection area 11B, and the second optical image 12B of the second image B is projected onto the second projection area 11B. Accordingly, for a user who has been observing the second projection area 11B, apart from the second image 12B, a part of the first optical image 12A is virtually recognized as an image lag.

Hence, in the example illustrated in FIG. 11, as described above, the blanking period BWP is provided. Consequently, in the optical modulation element OM, when the image is switched from the first image A to the second image B, there will be no period in which the first image A and the second image B are simultaneously displayed on the display area DA. In addition, a change point of the switching signal SS is set at a rear edge of the blanking period BWP. Thereby, while the entire area of the display area DA of the optical modulation element OM is switched from the first image A to the black image, an optical image of the first image A is continued to be projected onto the first projection area 11A, and is not projected onto the second projection area 11B. Accordingly, it is possible to prevent an image lag from being virtually recognized when the image is switched between the first image A and the second image B. Note that the black image means that light which reaches the polarization control element PC from the optical modulation element OM hardly exists, and an optical image to be projected is not existent. In other words, in a state in which the optical image of the first image A including the black image is projected onto the first projection area 11A, an area corresponding to the black image is visually recognized as being transparent, and a part of the first projection area 11A is not displayed in black.

Here, as the measures against an image lag, an example in which black image data is input to the optical modulation element OM in the blanking period BWP has been described. However, the measures which can be taken are not limited to the above. For example, in the blanking period BWP, the light sources LS of the illumination device IL may be turned off.

Also, instead of providing the blanking period BWP, also by controlling the illumination area IA in the illumination device IL, and the mode for the emission area AA of the polarization control element PC, the image lag can be similarly prevented. Examples of the control will be explained below with reference to the drawings.

Figure 12:
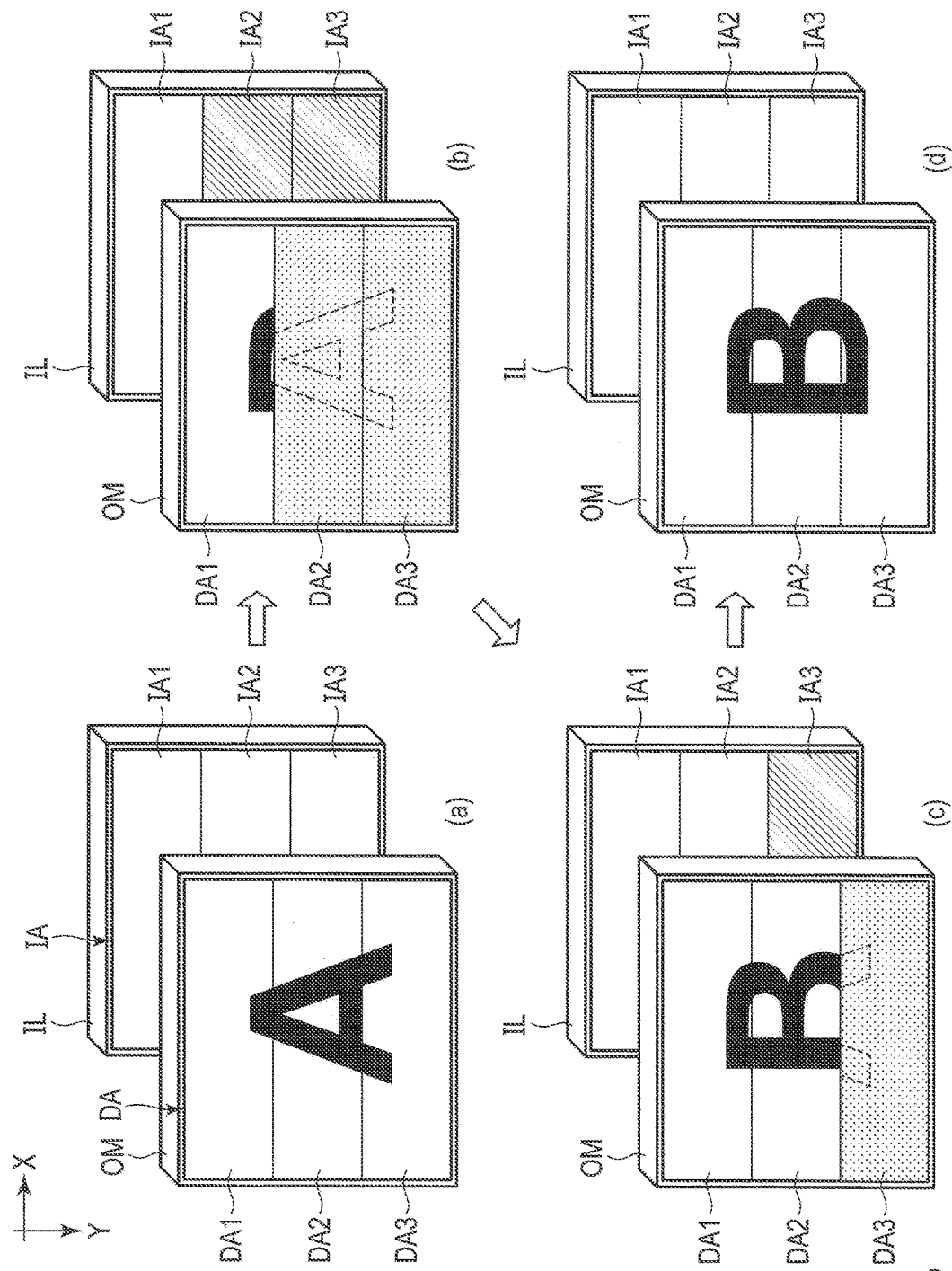
FIG. 12 is an illustration for explaining an example of control for controlling an illumination area IA in the illumination device IL in accordance with an image displayed in a display area DA of the optical modulation element OM.

FIG. 12 is an illustration for explaining an example of control for controlling the illumination area IA in the illumination device IL in accordance with the image displayed in the display area DA of the optical modulation element OM. In the example illustrated, the optical modulation element OM includes first to third sub-display areas DA1 to DA3 each extending in the first direction X in the display area DA. The illumination device IL includes first to third sub-illumination areas IA1 to IA3 opposed to the first to third sub-display areas DA1 to DA3, respectively, in the illumination area IA. Each of the first to third sub-display areas DA1 to DA3 is constituted of pixels PX, and each of the first to third sub-illumination areas IA1 to IA3 includes at least one light source LS, though not described in detail.

First, as shown in FIG. 12(a), in a state in which the first image "A" is displayed in the first to third sub-display areas DA1 to DA3, the first to third sub-illumination areas IA1 to IA3 are all lit, and each of the first to third sub-display areas DA1 to DA3 is illuminated. After the light of the first to third sub-display areas DA1 to DA3, in other words, the light which displays the first image "A" (the second polarized light), has been emitted as the first polarized light by the polarization control element PC controlled in the first mode, the first polarized light is transmitted through the polarization separation element PS, and is projected onto the first projection area 11A as the first optical image 12A through the first optical path 401.

After that, as shown in FIG. 12(b), when the image is switched from the first image A to the second image B in the optical modulation element OM, immediately after the writing of the second image data D2 for the second image has been started, a part of the second image "B" is displayed in the first sub-display area DA1, and a part of the first image "A" is displayed in the second sub-display area DA2 and the third sub-display area DA3. In this state, for example, the first sub-illumination area IA1 is lit, and the light is turned off in both the second sub-illumination area IA2 and the third sub-illumination area IA3. Accordingly, only the first sub-display area DA1 is illuminated. At the time when the writing of the second image data D2 is started, as described above, the polarization control element PC is switched to be in the second mode. Accordingly, after the light of the first sub-display area DA1, in other words, the light which displays the second image "B" (the second polarized light) has been transmitted as the second polarized light by the polarization control element PC, the second polarized light is reflected by the polarization separation element PS, and is projected onto the second projection area 11B as the second optical image 12B through the second optical path 402. At this time, although the first image "A" is displayed in the second sub-display area DA2 and the third sub-display area DA3, because these display areas are not illuminated, light from these areas is virtually not projected.

After that, as shown in FIG. 12(c), a part of the second image "B" is displayed in the first sub-display area DA1 and the second sub-display area DA2, and a part of the first image "A" is displayed in the third sub-display area DA3. In this state, for example, the first sub-illumination area IA1 and the second sub-illumination area IA2 are both lit, and the light is turned off in the third sub-illumination area IA3. Accordingly, the first sub-display area DA1 and the second sub-display area DA2 are illuminated. While the light from the first sub-display area DA1 and the second sub-display area DA2 is projected onto the second projection area 11B as the second optical image 12B, light from the third sub-display area DA3 is virtually not projected.

After that, as shown in FIG. 12(d), the second image "B" is displayed in the first to third sub-display areas DA1 to DA3. In this state, the first to third sub-illumination areas IA1 to IA3 are all lit, and the first to third sub-display areas DA1 to DA3 are illuminated. The light from the first to third sub-display areas DA1 to DA3 is projected onto the second projection area 11B as the second optical image 12B.

By the control example as described above, even at a time when the first image and the second image are simultaneously displayed in the display area DA, an image lag can be suppressed.

FIG. 13 is an illustration for explaining an example of control for controlling the emission area AA of the polarization control element PC in accordance with the image displayed in the display area DA of the optical modulation element OM. In the example illustrated, the polarization control element PC includes first to third sub-emission areas SA1 to SA3 opposed to the first to third sub-display areas DA1 to DA3, respectively, in the emission area AA. As shown in FIG. 9(b), each of the sub-emission areas SA corresponds to an area where the control electrodes 13 and 14 are opposed to each other, though not described in detail.

First, as shown in FIG. 13(a), in a state in which the first image "A" is displayed in the first to third sub-display areas DA1 to DA3, the first to third sub-emission areas SA1 to SA3 are all controlled in the first mode. The light (the second polarized light) which displays the first image "A" of the first to third sub-display areas DA1 to DA3 is emitted as the first polarized light 303A in each of the first to third sub-emission areas SA1 to SA3. After that, the first polarized light 303A is transmitted through the polarization separation element PS, and is projected onto the first projection area 11A as the first optical image 12A.

After that, as shown in FIG. 13(b), a part of the second image "B" is displayed in the first sub-display area DA1, and a part of the first image "A" is displayed in the second sub-display area DA2 and the third sub-display area DA3. In this state, for example, the first sub-emission area SA1 is controlled in the second mode, and the second sub-emission area SA2 and the third sub-emission area SA3 are both controlled in the first mode. Consequently, after the light (the second polarized light) which displays the second image "B" of the first sub-display area DA1 has been emitted as the second polarized light 303B in the first sub-emission area SA1, the second polarized light 303B is reflected by the polarization separation element PS and is projected onto the second projection area 11B as the second optical image 12B. At this time, after the light (the second polarized light) which displays the first image "A" of the second sub-display area DA2 and the third sub-display area DA3 has been emitted as the first polarized light 303A in the second sub-emission area SA2 and the third sub-emission area SA3, the first polarized light 303A is transmitted through the polarization separation element PS and is projected onto the first projection area 11A as the first optical image 12A.

After that, as shown in FIG. 13(c), a part of the second image "B" is displayed in the first sub-display area DA1 and the second sub-display area DA2, and a part of the first image "A" is displayed in the third sub-display area DA3. In this state, for example, the first sub-emission area SA1 and the second sub-emission area SA2 are both controlled in the second mode, and the third sub-emission area SA3 is controlled in the first mode. Consequently, after the light of each of the first sub-display area DA1 and the second sub-display area DA2 has been emitted as the second polarized light 303B in the first sub-emission area SA1 and the second sub-emission area SA2, the second polarized light 303B is reflected by the polarization separation element PS and is projected onto the second projection area 11B as the second optical image 12B. Also, after the light of the third sub-display area DA3 has been emitted as the first polarized light 303A in the third sub-emission area SA3, the first polarized light 303A is transmitted through the polarization separation element PS and is projected onto the first projection area 11A as the first optical image 12A.

After that, as shown in FIG. 13(d), the second image "B" is displayed in the first to third sub-display areas DA1 to DA3. In this state, the first to third sub-emission areas SA1 to SA3 are all controlled in the second mode. After the light of each of the first to third sub-display areas DA1 to DA3 has been emitted as the second polarized light 303B in the first to third sub-emission areas SA1 to SA3, the second polarized light 303B is reflected by the polarization separation element PS and is projected onto the second projection area 11B as the second optical image 12B.

By the control example as described above, even at a time when the first image and the second image are simultaneously displayed in the display area DA, an image lag can be suppressed.

<<Space-division Driving Method>>

Next, a space-division driving method will be described.

Figure 14:
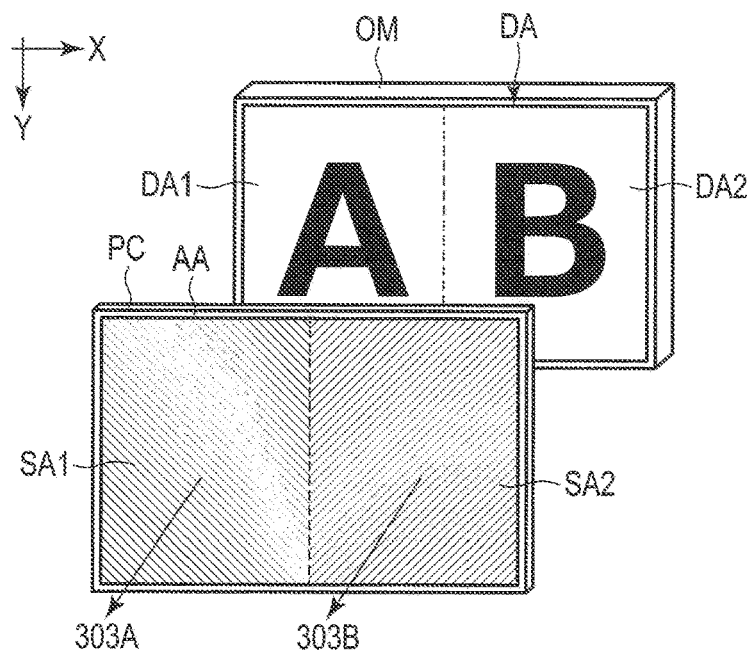
FIG. 14 is an illustration showing a configuration example of the display device 10 to which a space-division driving method is applied.

FIG. 14 is an illustration showing a configuration example of the display device 10 to which the space-division driving method is applied. Here, only the main portions necessary for explanation are illustrated briefly. The optical modulation element OM includes the first sub-display area DA1 and the second sub-display area DA2 which do not overlap one another in the display area DA. In the example illustrated, the first sub-display area DA1 and the second sub-display area DA2 are arranged in the first direction X. The first image "A" is displayed in the first sub-display area DA1, and the second image "B" is displayed in the second sub-display area DA2.

The polarization control element PC includes the first sub-emission area SA1 opposed to the first sub-display area DA1, and the second sub-emission area SA2 opposed to the second sub-display area DA2 in the emission area AA. The first sub-emission area SA1 corresponds to an area indicated by downward-sloping hatch lines in the drawing, and includes a retardation layer which imparts a $\lambda/2$ retardation to the transmitted light. Accordingly, the first sub-emission area SA1 emits the second polarized light from the first sub-display area DA1 as the first polarized light 303A. The second sub-emission area SA2 corresponds to an area indicated by upward-sloping hatch lines in the drawing, and does not include a retardation layer so that retardation is not imparted to the transmitted light. Accordingly, the second sub-emission area SA2 emits the second polarized light from the second sub-display area DA2 as the second polarized light 303B. In the explanation of the space-division driving method provided below, it is assumed that an area merely referred to as the first sub-emission area SA1 includes the retardation layer, and an area merely referred to as the second sub-emission area SA2 does not include the retardation layer.

The first polarized light 303A emitted from the first sub-emission area SA1 and the second polarized light 303B emitted from the second sub-emission area SA2 are projected onto the first projection area 11A and the second projection area 11B through the first optical path 401 and the second optical path 402, respectively, as described above.

Figure 15:
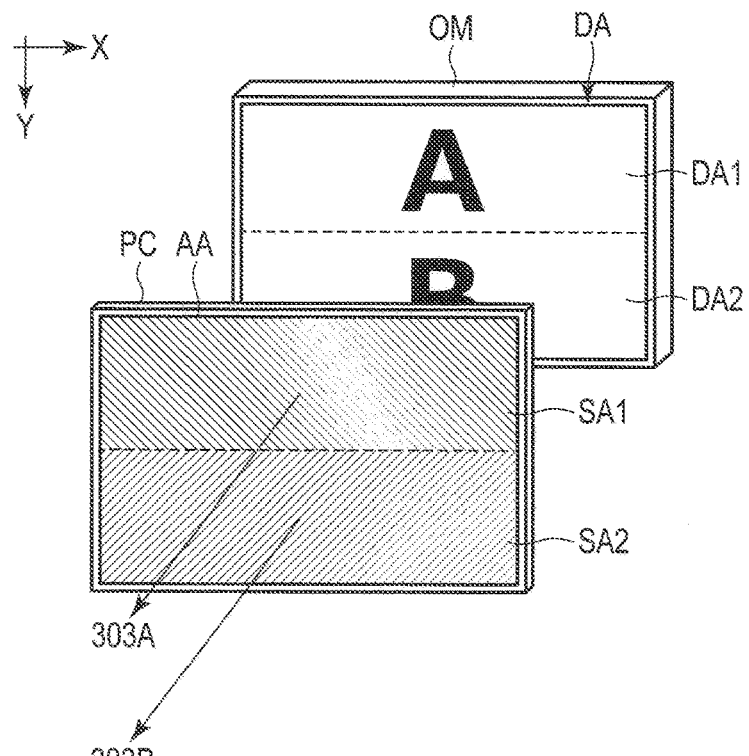
FIG. 15 is illustration showing another configuration example of the display device 10 to which the space-division driving method is applied.

FIG. 15 is an illustration showing another configuration example of the display device 10 to which the space-division driving method is applied. The configuration example illustrated in FIG. 15 is different from the configuration example illustrated in FIG. 14 in that the first sub-display area DA1 and the second sub-display area DA2, and the first sub-emission area SA1 and the second sub-emission area SA2 are arranged in the second direction Y. The first polarized light 303A emitted from the first sub-emission area SA1 and the second polarized light 303B emitted from the second sub-emission area SA2 are projected onto the first projection area 11A and the second projection area 11B, respectively, as in the above case.

Figure 16:
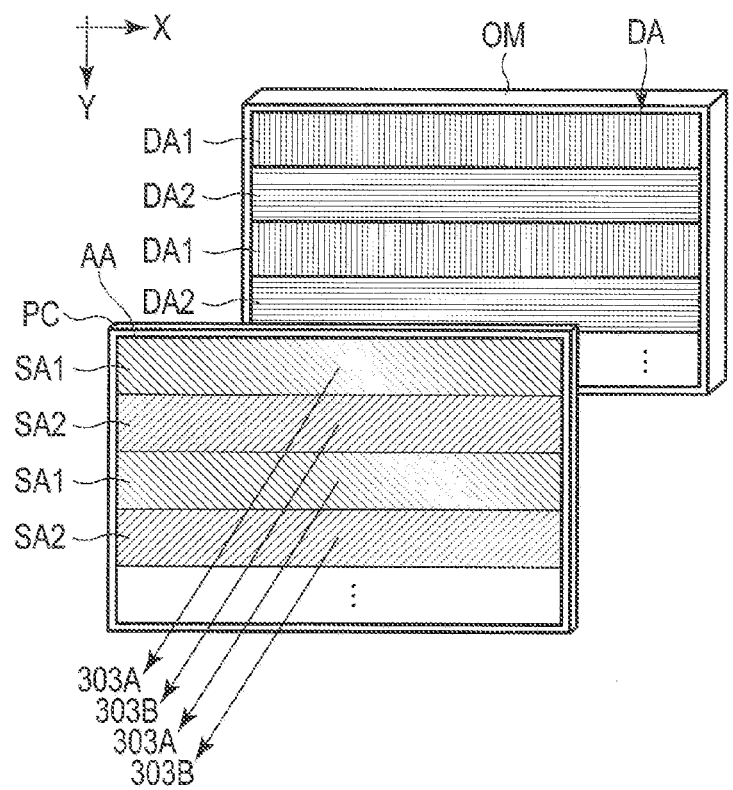
FIG. 16 is an illustration showing yet another configuration example of the display device 10 to which the space-division driving method is applied.

FIG. 16 is an illustration showing yet another configuration example of the display device 10 to which the space-division driving method is applied. The configuration example illustrated in FIG. 16 is different from the configuration example illustrated in FIG. 14 in that the first sub-emission area SA1 and the second sub-emission area SA2 are each formed in a strip shape, and are arranged alternately in the polarization control element PC. In the example illustrated, each of the first sub-emission area SA1 and the second sub-emission area SA2 is formed in a strip shape extending in the first direction X. Also, the first sub-emission area SA1 and the second sub-emission area SA2 are arranged alternately along the second direction Y. Note that each of the first sub-emission area SA1 and the second sub-emission area SA2 may be formed in a strip shape extending in a direction different from the first direction X.

The first sub-display area DA1 and the second sub-display area DA2 are opposed to the first sub-emission area SA1 and the second sub-emission area SA2, respectively. In other words, the first sub-display area DA1 and the second sub-display area DA2 are each formed in a strip shape extending in the first direction X, and are arranged alternately along the second direction Y. In FIG. 16, the first sub-display area DA1 corresponds to an area indicated by vertical lines, and the second sub-display area DA2 corresponds to an area indicated by horizontal lines. Each of the first sub-display area DA1 and the second sub-display area DA2 is constituted of a plurality of pixels. In this display area DA, the first image is displayed by an aggregate of a plurality of first sub-display areas DA1, and the second image is displayed by an aggregate of a plurality of second sub-display areas DA2.

The second polarized light from each of the first sub-display areas DA1 is emitted from the first sub-emission area SA1 as the first polarized light 303A, and is projected onto the first projection area 11A. The second polarized light from each of the second sub-display areas DA2 is emitted from the second sub-emission area SA2 as the second polarized light 303B, and is projected onto the second projection area 11B.

Figure 17:
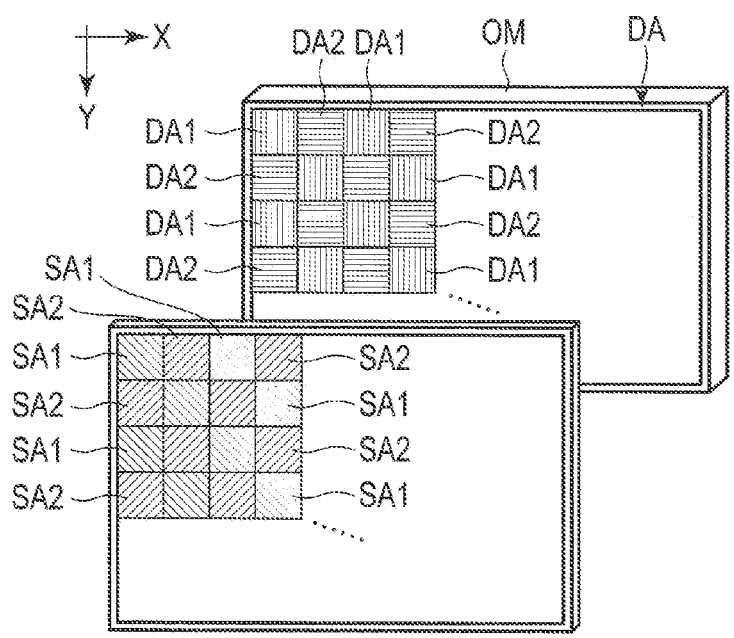
FIG. 17 is an illustration showing yet another configuration example of the display device 10 to which the space-division driving method is applied.

FIG. 17 is an illustration showing yet another configuration example of the display device 10 to which the space-division driving method is applied. The configuration example illustrated in FIG. 17 is different from the configuration example illustrated in FIG. 14 in that the first sub-emission areas SA1 and the second sub-emission areas SA2 are formed in a checkered pattern in the polarization control element PC. In other words, the first sub-emission area SA1 and the second sub-emission area SA2 are arranged alternately along the first direction X and the second direction Y.

The first sub-display area DA1 and the second sub-display area DA2 are opposed to the first sub-emission area SA1 and the second sub-emission area SA2, respectively. In other words, the first sub-display area DA1 and the second sub-display area DA2 are formed in a checked pattern, and are arranged alternately along the first direction X and the second direction Y.

The second polarized light from each of the first sub-display areas DA1 is emitted from the first sub-emission area SA1 as the first polarized light 303A, and an aggregate of the first polarized light 303A is projected onto the first projection area 11A as the first optical image. The second polarized light from each of the second sub-display areas DA2 is emitted from the second sub-emission area SA2 as the second polarized light 303B, and an aggregate of the second polarized light 303B is projected onto the second projection area 11B as the second optical image.

According to the space-division driving method as described above, polarization control of the polarization control element PC does not need to be performed electrically, and by displaying each image corresponding to a predetermined sub-display area, images can be projected selectively.

<<Local Dimming Control>>

Next, local dimming control will be described.

Figure 18:
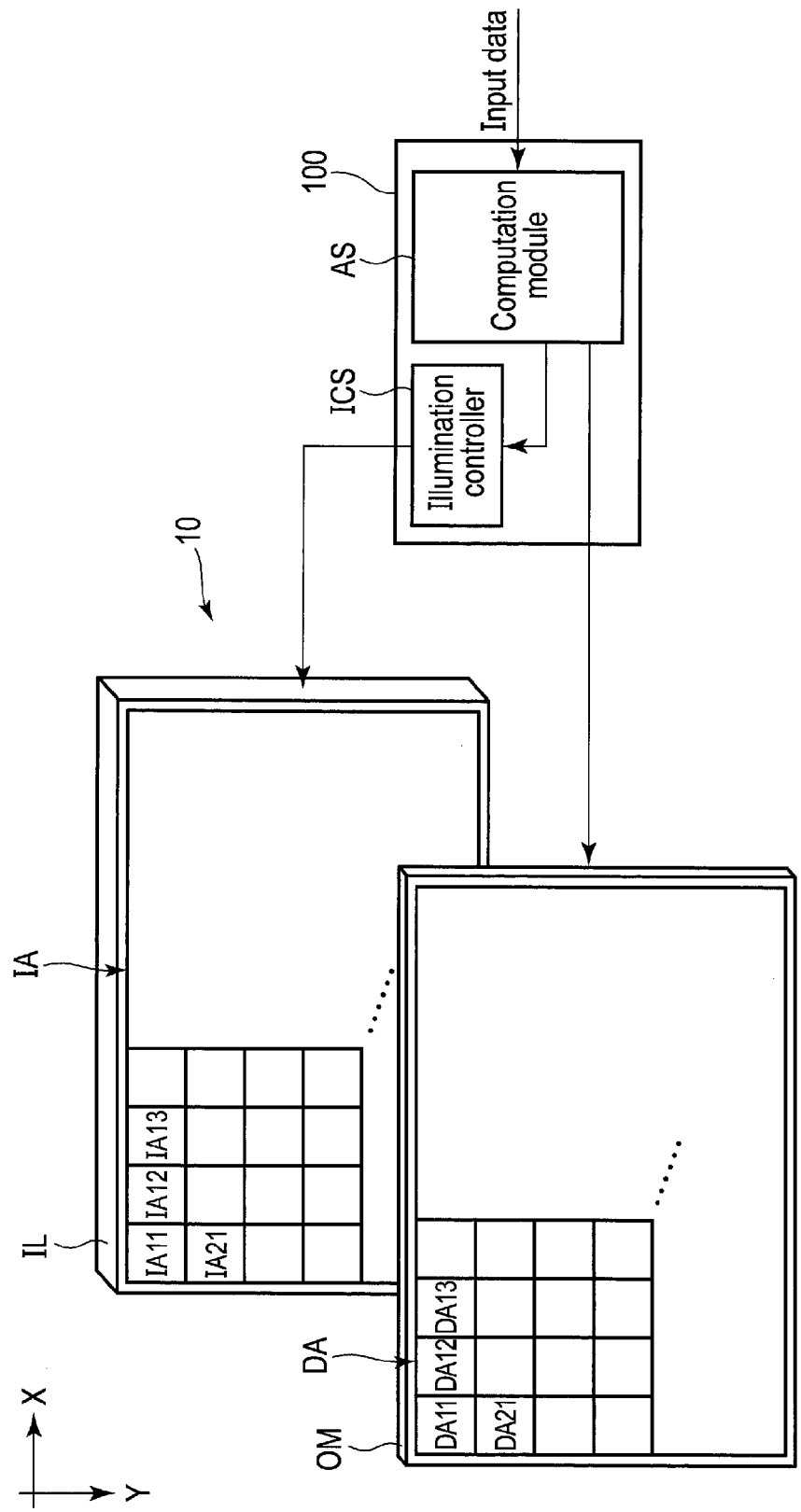
FIG. 18 is an illustration showing a configuration example of the display device 10 to which local dimming control is applied.

FIG. 18 is an illustration showing a configuration example of the display device 10 to which the local dimming control is applied. The illumination device IL includes sub-illumination areas IA1, IA2, . . . , arranged in a matrix in the illumination area IA. The optical modulation element OM includes sub-display areas DA11, DA12, . . . , arranged in a matrix in the display area DA. As has been explained with reference to FIG. 7, each of the sub-illumination areas includes at least one light source. The sub-display areas are opposed to the sub-illumination areas, respectively, and each of the sub-display areas comprises m×n pixels PX. The brightness of the sub-illumination areas can be controlled in accordance with a value of a current supplied to the light source. Accordingly, by changing the values of the current of the light sources of the sub-illumination areas, the brightness can be changed for each of the sub-illumination areas. The light emitted from each of the sub-illumination areas illuminates the opposed sub-display area. Accordingly, in the display area DA, by setting the brightness of a sub-illumination area, which illuminates the sub-display area including many pixels whose gradation values are low, at a low level, and setting the brightness of a sub-illumination area, which illuminates the sub-display area including many pixels whose gradation values are high, at a high level, the contrast ratio of an image displayed in the display area DA can be improved.

An example of control will be briefly described below. The main controller 100 comprises a computation module AS, an illumination controller ICS, etc. The computation module AS performs necessary processing for input data for displaying an image on the optical modulation element OM, and generates image data. Further, the computation module AS inputs the generated image data to the optical modulation element OM. Thereby, the optical modulation element OM can display an image in the display area DA. Meanwhile, the computation module AS calculates the maximum gradation value of the pixel included in each sub-display area overlapping the sub-illumination area from the gradation values of the image data covering the entire pixels in the display area DA. The illumination controller ICS calculates a value of the current to be supplied to the light source of the sub-illumination area, on the basis of the maximum gradation value calculated by the computation module AS. Then, the illumination controller ICS supplies the current of the calculated value to the light source. The computation module AS and the illumination controller ICS are controlled based on a synchronization signal. The light source provided in the sub-illumination area is thereby lit at a brightness level according to the maximum gradation value in synchronization with displaying of the image in the overlapping sub-display area. Note that when the maximum gradation value of the sub-display area is low, the image can be displayed at a brightness level more reduced than originally intended. Further, if the maximum gradation value is extremely low, the light source may be turned off. Also, while the current value of the light source has been determined based on the maximum gradation value of the sub-display area in the above, other methods, such as determining the current value of the light source based on the average gradation value of the pixels included in the sub-display area, may be applied. In either case, the current value of the light source is determined based on a gradation value obtained by a predetermined algorithm from the pixel data.

The local dimming control as described above can be applied to either of the time-division driving method and the space-division driving method. By this feature, the contrast ratio of the optical image projected onto the projection plane 11 can be improved. In addition, power consumption of the illumination device IL can be reduced, and the amount of heat generation of the illumination device IL can be reduced.

<<Modification>>

Figure 19:
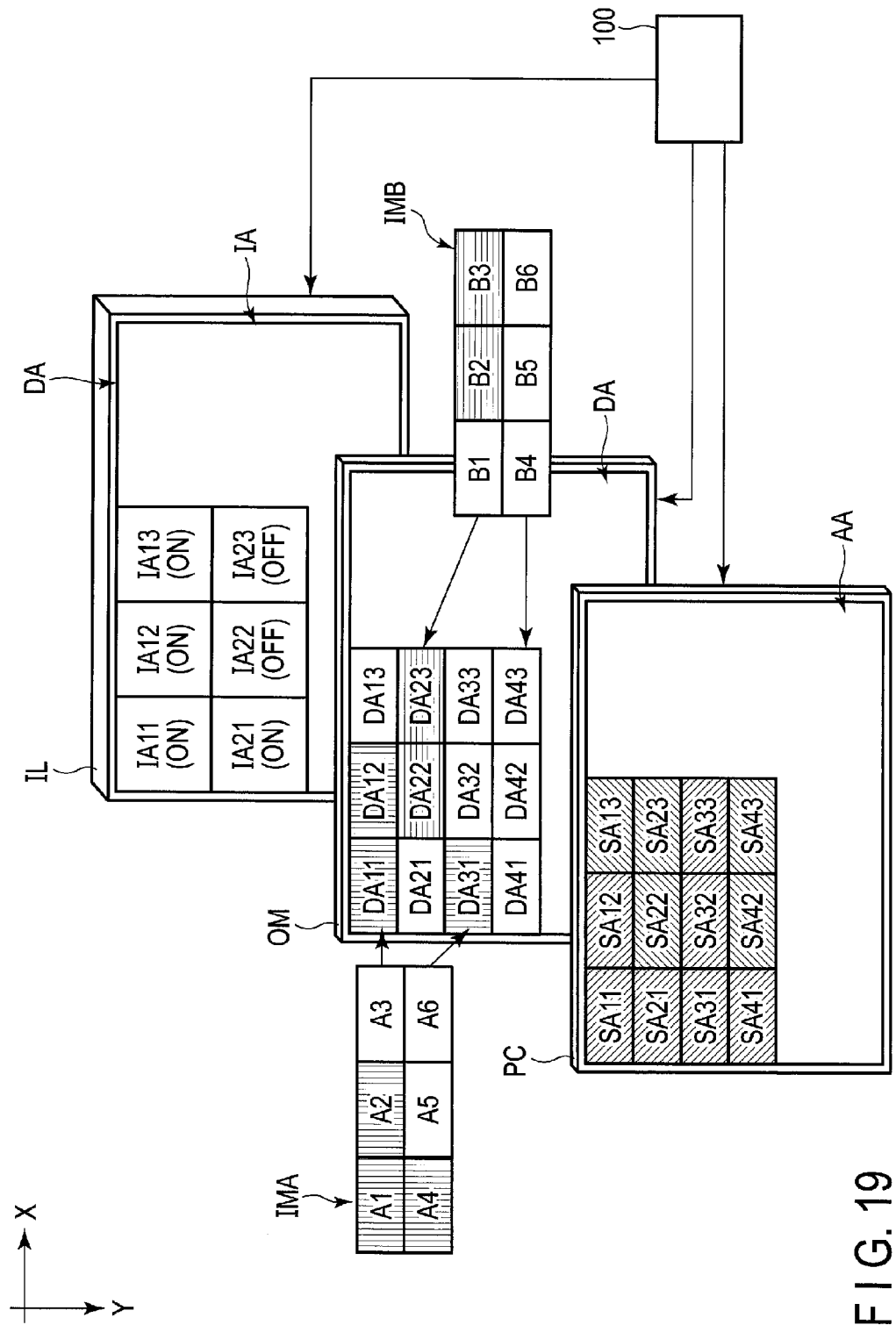
FIG. 19 is an illustration for explaining a modification of the display device 10 to which the local dimming control is applied.

FIG. 19 is an illustration for explaining a modification of the display device 10 to which the local dimming control is applied. The modification explained in this specification corresponds to an example of control in a case where a plurality of sub-display areas having a large difference in the gradation values (i.e., a bright section and a dark section) exist at a position opposed to one sub-illumination area. Here, in order to make the explanation simple, as illustrated in the drawing, a case where a first image IMA includes image blocks A1 to A6, and a second image IMB includes image blocks B1 to B6 is assumed. In the first image IMA, image blocks A1, A2, and A4 are bright sections (portions indicated by vertical lines in the drawings), and image blocks A3, A5, and A6 are dark sections. In the second image IMB, image blocks B2 and B3 are bright sections (portions indicated by horizontal lines in the drawings), and image blocks B1 and B4 to B6 are dark sections.

The optical modulation element OM includes sub-display areas DA11 to DA13 which display image blocks A1 to A3, respectively, sub-display areas DA21 to DA23 which display image blocks B1 to B3, respectively, sub-display areas DA31 to DA33 which display image blocks A4 to A6, respectively, and sub-display areas DA41 to DA43 which display image blocks B4 to B6, respectively.

The illumination device IL includes the sub-illumination area IA11 overlapping the sub-display areas DA11 and DA21, the sub-illumination area IA12 overlapping the sub-display areas DA12 and DA22, the sub-illumination area IA13 overlapping the sub-display areas DA13 and DA23, the sub-illumination area IA21 overlapping the sub-display areas DA31 and DA41, the sub-illumination area IA22 overlapping the sub-display areas DA32 and DA42, and the sub-illumination area IA23 overlapping the sub-display areas DA33 and DA43.

The polarization control element PC includes sub-emission areas SA11 to SA13 overlapping the sub-display areas DA11 to DA13, sub-emission areas SA21 to SA23 overlapping the sub-display areas DA21 to DA23, sub-emission areas SA31 to SA33 overlapping the sub-display areas DA31 to DA33, and sub-emission areas SA41 to SA43 overlapping the sub-display areas DA41 to DA43.

The main controller 100 controls the optical modulation element OM, and causes the first image IMA and the second image IMB to be displayed in the display area DA. Also, the main controller 100 controls the illumination device IL and the polarization control element PC in synchronization with displaying of the images on the optical modulation element OM. An example of control of the illumination device IL and the polarization control element PC will be described below.

The main controller 100 selects between lighting and turning off of the light for the corresponding sub-illumination area based on the respective gradation values of the first image IMA and the second image IMB, determines the brightness of the sub-illumination area to be lit (i.e., the current value of the light source provided in the sub-illumination area), and drives the illumination device IL. In the example illustrated, in the display area DA, the sub-display areas DA11, DA12, DA22, DA23, and DA31 are bright sections, and the sub-display areas DA13, DA21, DA32, DA33, and DA41 to DA43 are dark sections. In this state, the sub-illumination areas IA11 to 13 and IA21 are lit (ON) at the brightness level determined for each of these areas, and the light of the sub-illumination areas IA22 and IA23 is turned off (OFF). In this way, each of the sub-display areas corresponding to the bright section is illuminated with predetermined brightness. Meanwhile, although the sub-display areas DA13, DA21, and DA41 correspond to the dark sections, they are illuminated by the sub-illumination areas lit together with the sub-display areas DA11, DA23, and DA31 of the bright sections adjacent to the aforementioned dark sections, respectively. In such a state, when the first image IMA and the second image IMB are projected onto the projection plane, the dark sections are visually recognized as being bright, and the degradation in display quality may be caused or the degree of contrast may be lowered.

Hence, the main controller 100 determines the mode for each of the sub-emission areas and drives the polarization control element PC, on the basis of the respective gradation values of the first image IMA and the second image IMB, and information, etc., on the sub-illumination area to be lit. As such a polarization control element PC, the configuration example shown in FIG. 9(c), for example, can be applied. In the polarization control element PC, basically, a sub-emission area overlapping the sub-display area in which the first image IMA is displayed is controlled in the first mode, and a sub-emission area overlapping the sub-display area in which the second image IMB is displayed is controlled in the second mode. That is, normally, the sub-emission areas SA11 to SA13 and SA31 to SA33 are controlled in the first mode, and the sub-emission areas SA21 to SA23 and SA41 to SA43 are controlled in the second mode. In contrast, in the present control example, a sub-emission area overlapping the sub-display area corresponding to the dark section is controlled in a mode opposite to the mode which should have been normally applied. In the example illustrated, of the sub-emission areas overlapping the sub-display areas in which the first image IMA is displayed, the sub-display area DA13 is controlled in the second mode. Also, of the sub-emission areas overlapping the sub-display areas in which the second image IMB is displayed, the sub-display areas DA21 and DA41 are controlled in the first mode. In the drawing, the sub-emission areas controlled in the first mode are represented by downward-sloping hatch lines, and the sub-emission areas controlled in the second mode are represented by upward-sloping hatch lines.

In this way, the polarization control element PC causes the light from the bright section of the first image IMA displayed on the optical modulation element OM to be emitted as the first polarized light from the sub-emission area of the first mode, and causes the light from the dark section of the first image IMA to be emitted as the second polarized light from the sub-emission area of the second mode. Similarly, the polarization control element PC causes the light from the bright section of the second image IMB displayed on the optical modulation element OM to be emitted as the second polarized light from the sub-emission area of the second mode, and causes the light from the dark section of the second image IMB to be emitted as the first polarized light from the sub-emission area of the first mode. Accordingly, only the bright sections of the first image IMA are projected onto the first projection area 11A of the projection plane 11, and the light of the dark sections are guided to the second projection area 11B. Similarly, only the bright sections of the second image IMB are projected onto the second projection area 11B of the projection plane 11, and the light of the dark sections are guided to the first projection area 11A. Consequently, degradation in display quality and lowering of the degree of contrast can be suppressed.

<<Brightness Control of Illumination Device>>

Figure 20:
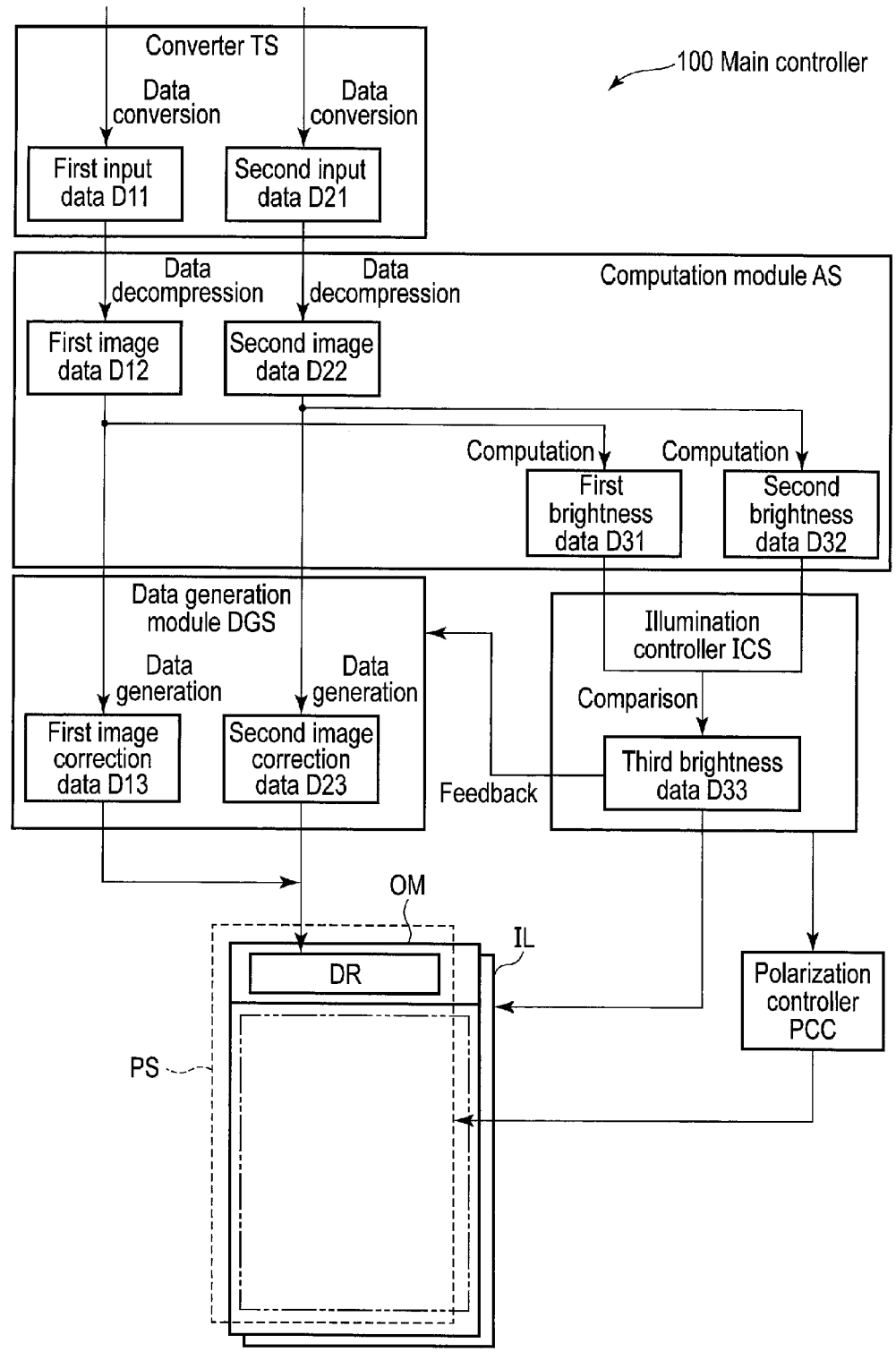
FIG. 20 is a block diagram showing a flow of data when luminance of a pixel PX is controlled.

FIG. 20 is a block diagram showing a flow of data when luminance of the pixel PX is controlled. The main controller 100 includes a converter TS, the computation module AS, a data generator DGS, the illumination controller ICS, a polarization controller PCC, etc. Explanation will be given assuming that the optical modulation element OM is a transmissive display panel. Note that when the optical modulation element OM is a reflective display panel, the term "transmittance" in the following explanation is replaced with "reflectance". Further, in the explanation of the present configuration example, RGB data may be referred to as (R, G, B), and RGBW data may be referred to as (R, G, B, W).

The converter TS includes a linear conversion circuit, and converts data on the first image represented by RGB data in 8 bits (0 to 255) for each of R, G, and B into first input data D11 represented by linear RGB data, for example. The converter TS similarly converts data on the second image into second input data D21. Further, the converter TS normalizes the first input data D11 and the second input data D21 to values greater than or equal to 0 and less than or equal to 1. The first input data D11 and the second input data D21 correspond to, for example, the luminance of RGB pixels, and when the value is 0, the pixel is displayed black, and when the value is 1, the pixel is displayed white. Note that the normalization process of the first input data D11 and the second input data D21 is not necessarily required. When the optical modulation element OM includes a W pixel, in addition to the RGB pixels, after converting, for example, the 8-bit RGB data into linear RGB data by the converter TS, the converter TS allocates a common part of the RGB data to the W data, and generates RGBW data.

The computation module AS performs data decompression while maintaining the ratio between signal values (RGB data) of the red pixel, green pixel and blue pixel included in the first input data D11 for the first image, and converts the first input data D11 into first image data D12. At this time, a decompression rate of each item of data is a reciprocal of the maximum value of the RGB data, for example. That is, when the magnitude relation is R11>G11≥B11 for the first input data D11 (R11, G11, B11), the decompression rate is represented as (1/R11). Each item of the first image data D12 (R12, G12, B12) is calculated as follows: R12=(1/R11)× R11=1, G12=(1/R11)×G11=G11/R11, B12=(1/R11)× B11=B11/R11. The computation module AS similarly calculates second image data D22 from the second input data D21 for the second image.

Next, the computation module AS computes, on the basis of the first image data D12, first brightness data D31 representing the brightness of the illumination device IL necessary for realizing desired pixel luminance in an area driven with the first image data D12. The first brightness data D31 is normalized to a value which is greater than or equal to 0 and less than or equal to 1, for example. The illumination device IL is turned off when the value is 0, and turned on at the maximum brightness when the value is 1. When it is assumed that the first image data D12 corresponds to the transmittances of the RGB pixels, the pixel luminance can be represented as the product of the transmittance of the pixel and the brightness of the illumination device. The computation module AS calculates the first brightness data D31 from a reciprocal of the rate of decompression from the first input data D11 to the first image data D12. More specifically, when the decompression rate is 1/R11, the first brightness data D31 is calculated as R11. The computation module AS similarly calculates second brightness data D32 from the second image data D22.

The illumination controller ICS compares the first brightness data D31 and the second brightness data D32, and generates third brightness data D33. One of the first brightness data D31 and the second brightness data D32, for example, is selected as the third brightness data D33. The brightness data to be selected is one having a greater value of the first brightness data D31 and the second brightness data D32, for example, more specifically, brightness data for driving the illumination device IL at a high brightness level. The illumination controller ICS controls the brightness of the illumination device IL based on the third brightness data D33. The third brightness data D33 is data for determining a current value of the light source arranged in the area of the illumination device IL corresponding to the first image data D12 and the second image data D22. In addition, the illumination controller ICS feeds back the third brightness data D33 to the data generator DGS.

Also, the illumination controller ICS checks presence or absence of the dark section and the bright section in each item of the brightness data based on the first brightness data D31 and the second brightness data D32, and feeds back control data necessary for controlling the polarization control element PC to the polarization controller PCC. The polarization controller PCC controls the polarization control element PC based on the control data, and drives the polarization control element PC to be set in a corresponding mode for each of the sub-emission areas as has been explained with reference to FIG. 19.

The data generator DGS recomputes the first image data D12 based on the third brightness data D33 that has been fed back, and generates first image correction data D13 corresponding to the first image data D12. The first image correction data D13 is calculated by multiplying the first image data D12 by a correction coefficient, which is a value obtained by dividing the first brightness data D31 by the third brightness data D33 (D31/D33). More specifically, each item of RGB data of the first image correction data D13, i.e., (R13, G13, B13), is calculated as follows: R13=(D31/D33)×R12, G13=(D31/D33)×G12, B13=(D31/D33)× B12. When the first brightness data D31 is selected as the third brightness data D33, the first image correction data D13 is equal to the first image data D12. In addition, the data generator DGS recomputes the second image data D22 based on the third brightness data D33, and generates second image correction data D23 corresponding to the second image data D22. Note that a correction coefficient for this process is represented as a value obtained by dividing the second brightness data D32 by the third brightness data D33 (D32/D33).

The first image correction data D13 and the second image correction data D23 generated in this way are input to the driver DR. The driver DR drives the optical modulation element OM based on the first image correction data D13 and the second image correction data D23, and the first image and the second image are displayed. At this time, when the optical modulation element OM is a liquid crystal display panel whose modulation (transmittance or reflectance) is controlled by the applied voltage, the driver DR controls the voltage applied to the optical modulation element OM based on the first image correction data D13 and the second image correction data D23. More specifically, the voltage applied to the optical modulation element OM is changed in proportion to the correction coefficients of the first image correction data D13 and the second image correction data D23.

Calculation of the image correction data is not limited to that of the above example. That is, instead of calculating the brightness data and correction data from the image data corresponding to the area individually, an output of the illumination device IL of the corresponding area may be determined from the maximum gradation value, etc., included in the image data for displaying each of the first image and the second image to calculate the image correction data.

It suffices that either hardware or software realizes the function of the data processing of the main controller 100, and the data processing is not particularly limited. Also, if each of the converter TS, the computation module AS, the illumination controller ICS, and the data generator DGS is constituted of hardware, each element does not need to be distinguished from each other physically. That is, multiple functions may be realized by a physically single circuit.

Next, referring to FIGS. 21 and 22, data processing to be carried out when the first and second images are expressed by RGB pixels will be described based on an example of numerical values. Here, it is assumed that the first input data D11 (R11, G11, B11) is (0.20, 0.80, 0.80), and the second input data D21 (R21, G21, B21) is (0.60, 0.60, 0.60).

FIG. 21 is an illustration showing one example of data processing in the computation module AS.

Since the maximum value of the first input data D11 is G11=B11=0.80, the computation module AS performs data decompression assuming that the decompression rate of the first input data D11 is 1/0.80. The first image data D12 (R12, G12, B12) is calculated as (0.25, 1.00, 1.00) by multiplying the first input data D11 by the decompression rate. Since the first brightness data D31 is a reciprocal of the decompression rate (1/0.80), the first brightness data D31 is computed as D31=0.80 by the computation module AS.

Since the maximum value of the second input data D21 is R21=G21=B21=0.60, the computation module AS performs data decompression assuming that the decompression rate of the second input data D21 is 1/0.60. The second image data D22 (R22, G22, B22) is calculated as (1.00, 1.00, 1.00) by multiplying the second input data D21 by the decompression rate. Since the second brightness data D32 is a reciprocal of the decompression rate (1/0.60), the second brightness data D32 is computed as D32=0.60 by the computation module AS.

FIG. 22 is an illustration showing one example of data processing in the illumination controller ICS and the data generator DGS.

The illumination controller ICS compares the first brightness data D31, i.e., 0.80, with the second brightness data D32, i.e., 0.60, and selects the first brightness data D31 as the third brightness data D33. The data generator DGS performs recomputation based on the fed back third brightness data D33, i.e., 0.80, and generates the second image correction data D23 (R23, G23, B23), which is (0.75, 0.75, 0.75), from the second image data D22 (1.00, 1.00, 1.00). Note that the third brightness data D33 is equal to the first brightness data D31. Therefore, the data generator DGS does not perform recomputation to obtain the first image correction data D13, and generates the first image correction data D13 (R13, G13, B13), which is equal to the first image data D12 (R12, G12, B12), more specifically, (0.25, 1.00, 1.00).

Next, referring to FIGS. 23 and 24, data processing to be carried out when the first and second images are expressed by RGBW pixels will be described based on an example of numerical values. Here, it is assumed that first RGB data D10 (R10, G10, B10) converted by the converter TS is (0.30, 0.90, 0.90), and second RGB data D20 (R20, G20, B20) is (0.15, 0.90, 0.15).

Figure 23:
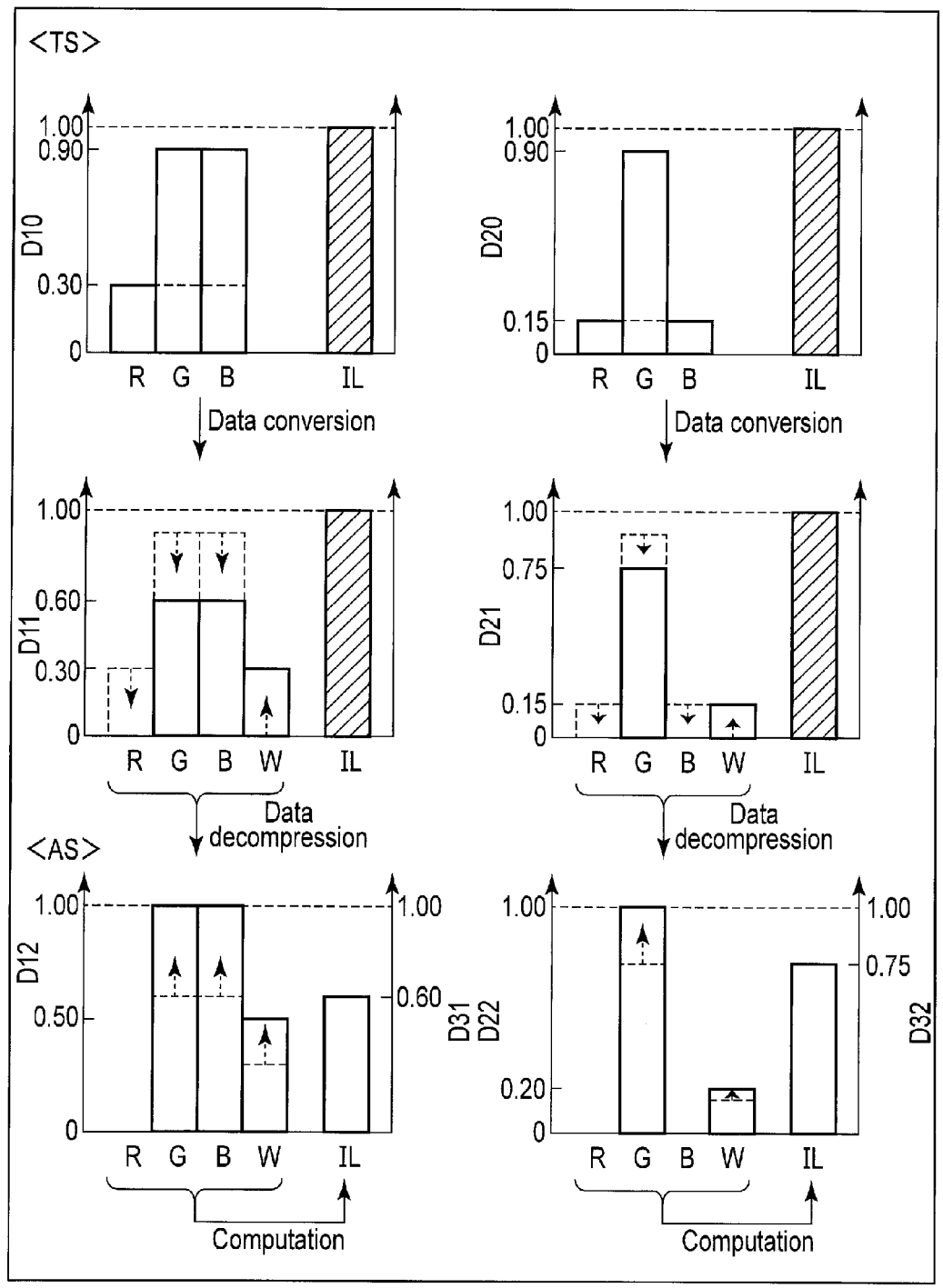

FIG. 23 is an illustration showing one example of data processing in the converter TS and the computation module AS. The converter TS allocates data common to the R data, G data, and B data of the first RGB data D10, i.e., 0.30, to W data, thereby converting the RGB data into RGBW data, and calculates the first input data D11 (R11, G11, B11, W11) as (0.00, 0.60, 0.60, 0.30). Also, the converter TS allocates data common to the R data, G data, and B data of the second RGB data D20, i.e., 0.15, to W data, thereby converting the RGB data into RGBW data, and calculates the second input data D21 (R21, G21, B21, W21) as (0.00, 0.75, 0.00, 0.15).

Since the maximum value of the first input data D11 is G11=B11=0.60, the computation module AS performs data decompression assuming that the decompression rate of the first input data D11 is 1/0.60. The first image data D12 (R12, G12, B12, W12) is calculated as (0.00, 1.00, 1.00, 0.50) by multiplying the first input data D11 by the decompression rate. Since the first brightness data D31 is a reciprocal of the decompression rate (1/0.60), the first brightness data D31 is computed as D31=0.60 by the computation module AS.

Since the maximum value of the second input data D21 is G21=0.75, the computation module AS performs data decompression assuming that the decompression rate of the second input data D21 is 1/0.75. The second image data D22 (R22, G22, B22, W22) is calculated as (0.00, 1.00, 0.00, 0.20) by multiplying the second input data D21 by the decompression rate. Since the second brightness data D32 is a reciprocal of the decompression rate (1/0.75), the second brightness data D32 is computed as D32=0.75 by the computation module AS.

FIG. 24 is an illustration showing one example of data processing in the illumination controller ICS and the data generator DGS.

The illumination controller ICS compares the first brightness data D31, i.e., 0.60, with the second brightness data D32, i.e., 0.75, and selects the second brightness data D32 as the third brightness data D33. The data generator DGS performs recomputation based on the fed back third brightness data D33, i.e., 0.75, and generates the first image correction data D13 (R13, G13, B13, W13), which is (0.00, 0.80, 0.80, 0.40), from the first image data D12 (0.00, 1.00, 1.00, 0.50). Note that the third brightness data D33 is equal to the second brightness data D32. Therefore, the data generator DGS does not perform recomputation to obtain the second image correction data D23, and generates the second image correction data D23 (R23, G23, B23, W23), which is equal to the second image data D22 (R22, G22, B22, W22), more specifically, (0.00, 1.00, 0.00, 0.20).

The brightness of the illumination device IL is controlled based on the third brightness data D33. Accordingly, as compared to a case where the brightness of the illumination device IL is controlled based on the first input data D11 and the second input data D12, it is possible to suppress the brightness of the illumination device IL, reduce power consumption of the illumination device IL, and reduce the amount of heat generation of the illumination device IL.

As described above, according to the present embodiment, a display device capable of displaying various images while reducing the amount of heat generation can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Further, even if structural elements in the claims are expressed as divided elements, added elements, or combined elements, these elements still fall within the scope of the present disclosure.

What is claimed is:

1. A display device comprising:
    an illumination device;
    an optical modulation element configured to emit image light corresponding to an image by using illumination light from the illumination device;
    a polarization control element configured to emit first polarized light, and second polarized light different from the first polarized light on the basis of the image light receiving from the optical modulation element;
    a polarization separation element configured to transmit the first polarized light as transmitted light and reflect the second polarized light as reflected light, the first and second polarized light entering the polarization separation element from the polarization control element; and
    a projector configured to project the transmitted light onto a first projection area of a projection plane, and projects reflected light onto a second projection area different from the first projection area of the projection plane.

2. The display device of claim 1, wherein:
    the optical modulation element includes a display area configured to emit first image light corresponding to a first image and second image light corresponding to a second image different from the first image alternately; and
    the polarization control element includes an emission area configured to emit the first polarized light on the basis of the first image light, and emit the second polarized light on the basis of the second image light.

3. The display device of claim 1, wherein:
    the optical modulation element includes a first sub-display area, and a second sub-display area different from the first sub-display area; and
    the polarization control element includes a first sub-emission area configured to emit the first polarized light on the basis of light receiving from the first sub-display area, and a second sub-emission area configured to emit the second polarized light on the basis of light receiving from the second sub-display area.

4. The display device of claim 1, wherein the projector comprises a concave mirror.

5. The display device of claim 1, wherein:
    the projector comprises a first concave mirror configured to project the transmitted light onto the first projection area, and a second concave mirror configured to project the reflected light onto the second projection area; and
    a first optical path length from the first concave mirror to the projection plane is different from a second optical path from the second concave mirror to the projection plane.

6. The display device of claim 1, further comprising an optical system configured to guide the transmitted light and the reflected light of the polarization separation element to different positions of the projector, respectively.

7. The display device of claim 1, further comprising a retardation plate located between the polarization separation element and the projector, and configured to impart retardation to at least one of the transmitted light and the reflected light.

8. The display device of claim 1, wherein:
    the illumination device includes sub-illumination areas each including a light source;
    the optical modulation element includes sub-display areas opposed to the sub-illumination areas, respectively; and
    the light source is configured to be controlled at a brightness level according to a gradation value of image data for driving the sub-display area.

9. The display device of claim 1, wherein the polarization control element is configured to emit the first polarized light on the basis of light corresponding to a bright section of a first image displayed on the optical modulation element and the second polarized light on the basis of light corresponding to a dark section of the firs image, and emit the second polarized light on the basis of light corresponding to a bright section of a second image displayed on the optical modulation element and the first polarized light on the basis of light corresponding to a dark section of the second image.

10. The display device of claim 1, further comprising:
    a computation module configured to compute first brightness data and second brightness data representing brightness of the illumination device according to first image data on a first image and second image data on a second image, the first and second images being displayed on the optical modulation element; and
    an illumination controller configured to control the brightness of the illumination device based on the first brightness data and the second brightness data computed by the computation module.

11. The display device of claim 1, further comprising:
    a computation module configured to compute first brightness data and second brightness data representing brightness of the illumination device according to first image data on a first image and second image data on a second image, the first and second images being displayed on the optical modulation element;
    an illumination controller configured to determine third brightness data which have a higher brightness from the first brightness data and the second brightness data computed by the computation module, and control the brightness of the illumination device based on the third brightness data;

a data generator configured to recomputed at least one of the first image data and the second image data based on the third brightness data, and generate first image correction data corresponding to the first image data, and second image correction data corresponding to the second image data; and a driver configured to drive the optical modulation element based on the first image correction data and the second image correction data generated by the data generator.

12. The display device of claim 10, wherein the computation module configured to perform data decompression while maintaining a ratio between signal values of a red pixel, a green pixel and a blue pixel included in first input data for the first image, and convert the first input data into the first image data.

13. The display device of claim 10, further comprising a converter configured to generate first input data including a signal value of a white pixel based on signal values of a red pixel, a green pixel, and a blue pixel for the first image, wherein
the computation module configured to perform data decompression while maintaining a ratio between signal values of respective color pixels included in the first input data, and converts the first input data into the first image data.

14. A display device comprising:
an illumination device;
an optical modulation element configured to emit image light corresponding to an image by using illumination light from the illumination device;
a polarization control element configured to emit first polarized light, and second polarized light different from the first polarized light on the basis of the image light receiving from the optical modulation element;
a polarization separation element configured to transmit the first polarized light as transmitted light and reflect the second polarized light as reflected light; and
a projector configured to project the transmitted light onto a first projection area of a projection plane, and projects reflected light onto a second projection area different from the first projection area of the projection plane, wherein
the optical modulation element includes a first sub-display area, and a second sub-display area different from the first sub-display area; and
the polarization control element includes a first sub-emission area configured to emit the first polarized light on the basis of light receiving from the first sub-display area, and a second sub-emission area configured to emit the second polarized light on the basis of light receiving from the second sub-display area.

15. The display device of claim 14, wherein:
the projector comprises a first concave mirror configured to project the transmitted light onto the first projection area, and a second concave mirror configured to project the reflected light onto the second projection area; and
a first optical path length from the first concave mirror to the projection plane is different from a second optical path from the second concave mirror to the projection plane.

16. The display device of claim 14, further comprising:
a computation module configured to compute first brightness data and second brightness data representing brightness of the illumination device according to first image data on a first image and second image data on a second image, the first and second images being displayed on the optical modulation element; and
an illumination controller configured to control the brightness of the illumination device based on the first brightness data and the second brightness data computed by the computation module.

17. The display device of claim 14, further comprising:
a computation module configured to compute first brightness data and second brightness data representing brightness of the illumination device according to first image data on a first image and second image data on a second image, the first and second images being displayed on the optical modulation element;
an illumination controller configured to determine third brightness data which have a higher brightness from the first brightness data and the second brightness data computed by the computation module, and control the brightness of the illumination device based on the third brightness data;
a data generator configured to recomputed at least one of the first image data and the second image data based on the third brightness data, and generate first image correction data corresponding to the first image data, and second image correction data corresponding to the second image data; and
a driver configured to drive the optical modulation element based on the first image correction data and the second image correction data generated by the data generator.

18. A display device comprising:
an illumination device;
an optical modulation element configured to emit image light corresponding to an image by using illumination light from the illumination device;
a polarization control element configured to emit first polarized light, and second polarized light different from the first polarized light on the basis of the image light receiving from the optical modulation element;
a polarization separation element configured to transmit the first polarized light as transmitted light and reflect the second polarized light as reflected light; and
a projector configured to project the transmitted light onto a first projection area of a projection plane, and projects reflected light onto a second projection area different from the first projection area of the projection plane, wherein
the projector comprises a first concave mirror configured to project the transmitted light onto the first projection area, and a second concave mirror configured to project the reflected light onto the second projection area; and
a first optical path length from the first concave mirror to the projection plane is different from a second optical path from the second concave mirror to the projection plane.

19. The display device of claim 18, wherein:
the illumination device includes sub-illumination areas each including a light source;
the optical modulation element includes sub-display areas opposed to the sub-illumination areas, respectively; and
the light source is configured to be controlled at a brightness level according to a gradation value of image data for driving the sub-display area.

* * * * *